US012609957B2

(12) United States Patent
Yanay et al.

(10) Patent No.: US 12,609,957 B2
(45) Date of Patent: *Apr. 21, 2026

(54) SYSTEMS AND METHODS FOR NETWORK SECURITY

(71) Applicant: AuthMind Inc., Rockville, MD (US)

(72) Inventors: Shlomo Yanay, Rockville, MD (US); Ankur Panchbudhe, Maharashtra (IN)

(73) Assignee: AUTHMIND INC., Rockville, MD (US)

( * ) Notice: Subject to any disclaimer, the term of this patent is extended or adjusted under 35 U.S.C. 154(b) by 13 days.

This patent is subject to a terminal disclaimer.

(21) Appl. No.: 18/398,666

(22) Filed: Dec. 28, 2023

(65) Prior Publication Data

US 2024/0146760 A1 May 2, 2024

Related U.S. Application Data

(62) Division of application No. 17/326,691, filed on May 21, 2021, now Pat. No. 11,895,144.

(Continued)

(51) Int. Cl.
*H04L 9/40* (2022.01)
*G06N 20/00* (2019.01)

(52) U.S. Cl.
CPC ......... *H04L 63/1441* (2013.01); *G06N 20/00* (2019.01); *H04L 63/0457* (2013.01);
(Continued)

(58) Field of Classification Search
CPC ............... H04L 63/102; H04L 63/0457; H04L 63/0428; H04L 63/1441; H04L 63/083;
(Continued)

(56) References Cited

U.S. PATENT DOCUMENTS 9,300,629 B1    3/2016   Jahr
9,305,106 B1 * 4/2016   Wang .................. H04L 63/0227
(Continued)

FOREIGN PATENT DOCUMENTS

CN      107409126 A   *   11/2017   ......... G06F 21/6218
JP      2005503596 A     2/2005
WO    2016097757 A1    6/2016

*Primary Examiner* — Ali S Abyaneh
(74) *Attorney, Agent, or Firm* — Potomac Law Group, PLLC

(57) ABSTRACT

Disclosed are implementations, including a method that includes monitoring dataflow streams in a network comprising multiple computing nodes, and determining network security characteristics for a dataflow stream, from the monitored dataflow streams, relating to security, authentication, and access events for accessing, via the dataflow stream, one or more of the multiple nodes. The method further includes determining potential violations by the dataflow stream of security policies defined for operation of the network, access functionality for the network, or identity attributes used by the network, based, at least in part, on the determined network security characteristics for the dataflow stream, and based on network-operation data comprising one or more of network security data, network identity data, and network access data. The network-operation data is stored in one or more data storage units in the network, and is configured to manage network access and operation for the multiple computing nodes.

20 Claims, 13 Drawing Sheets

Related U.S. Application Data

(60) Provisional application No. 63/029,156, filed on May 22, 2020.

(52) U.S. Cl.
  CPC .......... *H04L 63/083* (2013.01); *H04L 63/102*
         (2013.01); *H04L 63/20* (2013.01)

(58) Field of Classification Search
  CPC ................. H04L 63/0823; H04L 63/20; H04L
     2463/082; H04L 63/0838; H04L 2463/08;
       G06N 20/00; G06N 3/0454; G06N
           3/0445; G06N 3/045
  See application file for complete search history.

(56)       References Cited

U.S. PATENT DOCUMENTS

| | | | |
|---|---|---|---|
| 9,904,587 | B1 | 2/2018 | Potlapally et al. |
| 10,498,758 | B1 * | 12/2019 | Schwartz ................ H04L 43/12 |
| 2014/0283083 | A1 | 9/2014 | Gula et al. |
| 2015/0082399 | A1 | 3/2015 | Wu et al. |
| 2015/0229661 | A1 | 8/2015 | Balabine et al. |
| 2017/0357782 | A1 | 12/2017 | Leske et al. |
| 2018/0006953 | A1 | 1/2018 | Power et al. |
| 2020/0076843 | A1 * | 3/2020 | Luiggi ................ H04L 63/1425 |
| 2020/0151329 | A1 | 5/2020 | Chen et al. |

* cited by examiner

RADIUS Protocol

Typical use cases - VPN, RDP, VDI, Network Devices (routers, switches, APs, etc.)

Initial one-time setup options:

○ Configure our RADIUS Service in the network path in front of the RADIUS server either by taking over the IP/host-name or by changing the config in the VPN etc.

○ A load balancer can be used for HA.

○ RADIUS traffic can be routed to our Service using a router.

① Initiate authentication request

② RADIUS authentication request

③ Passwordless / MFA request

④ Push request to user's mobile

⑤ Passwordless auth (biometric,...)

⑥ Auth response & MPC/secret-sharing

⑦ Passwordless / MFA response

⑧ If password is mandatory for the Directory, generate and set a secure random password into the Directory ⑨ Forward auth request, inject generated password if required ⑩ Authenticate with Directory ⑪ RADIUS response ⑫ Authentication response

*FIG. 2B-2*

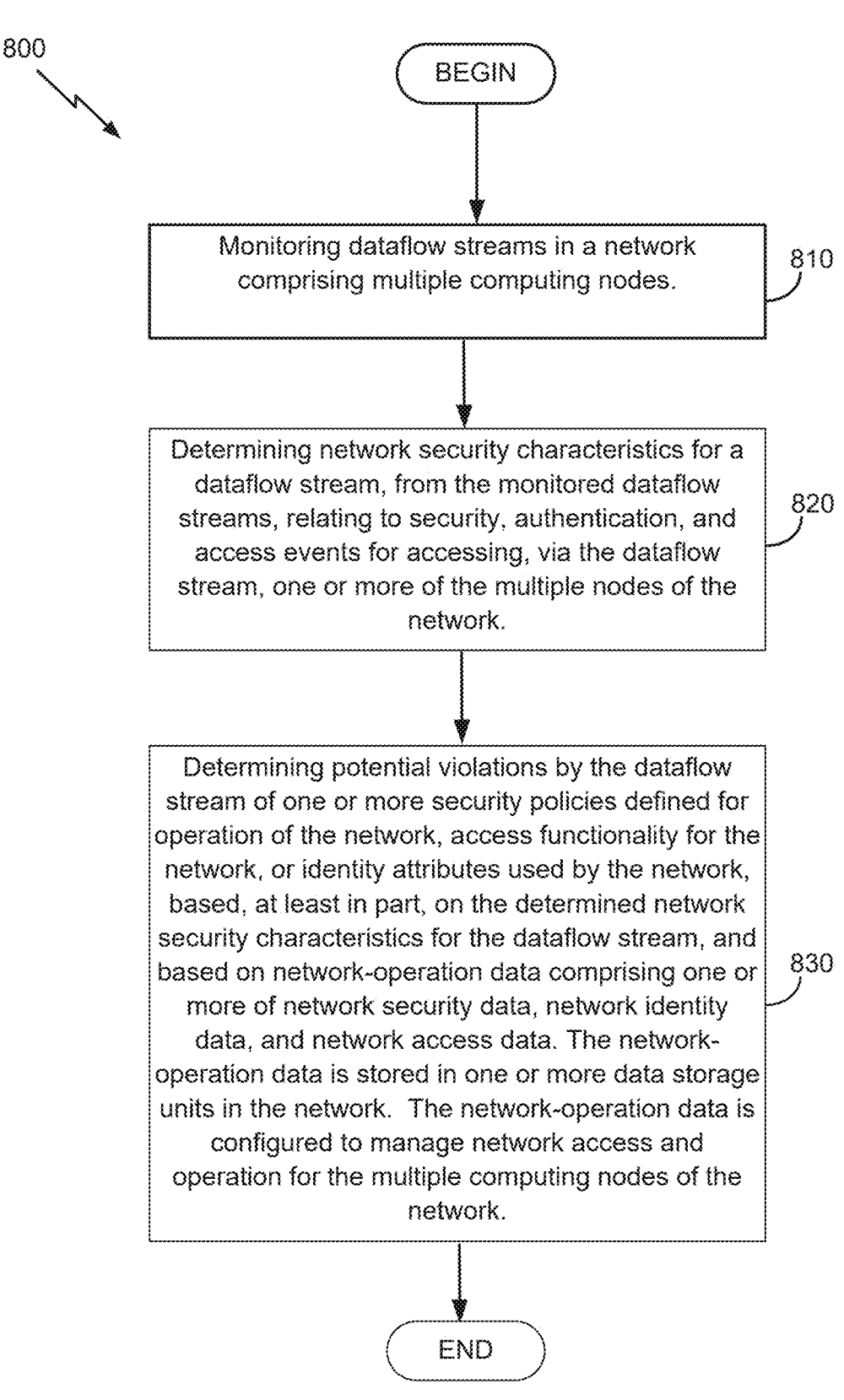

800

BEGIN

Monitoring dataflow streams in a network comprising multiple computing nodes. 810

Determining network security characteristics for a dataflow stream, from the monitored dataflow streams, relating to security, authentication, and access events for accessing, via the dataflow stream, one or more of the multiple nodes of the network. 820

Determining potential violations by the dataflow stream of one or more security policies defined for operation of the network, access functionality for the network, or identity attributes used by the network, based, at least in part, on the determined network security characteristics for the dataflow stream, and based on network-operation data comprising one or more of network security data, network identity data, and network access data. The network-operation data is stored in one or more data storage units in the network. The network-operation data is configured to manage network access and operation for the multiple computing nodes of the network. 830

END

FIG. 8

SYSTEMS AND METHODS FOR NETWORK SECURITY

CROSS-REFERENCE TO RELATED APPLICATIONS

This application is a divisional application of U/S/application Ser. No. 17/326,691, entitled "SYSTEMS AND METHODS FOR NETWORK SECURITY," and filed May 21, 2021, which claims priority to, and the benefit of, U.S. Provisional Application No. 63/029,156, entitled "SYSTEMS AND METHODS FOR NETWORK SECURITY," and filed May 22, 2020, the contents of which are incorporated herein by reference in their entireties.

BACKGROUND

Multi-factor authentication ("MFA") refers to the use of two or more authentication methods when establishing secured access to a network. For example, a user seeking to access a network application may be requested to enter a secret password, and additionally confirm the user's credentialed access via another method (e.g., through biometric verification, such as through fingerprinting authentication, iris recognition, facial recognition, etc.) A problem with MFA is that it tends to be a reactive authentication approach (pre-defined with no visibility to the authentication risk), and may not provide adequate protection for many apps, services, devices (legacy and new) within a network (e.g., once a user has gained access to a network, the user may have unfettered access to a substantial part of the network). Another problem of multi-factor authentication approaches, in circumstances where one of the authentication methodologies are based on password use, is that passwords tend to be weak, can be inadvertently shared and exposed (e.g., through innocuous use that might be captured by malevolent actors, or through malicious attempts to steal passwords, e.g., via phishing attacks).

Once a user gains access to a network, various applications running within the network may not have any further layers of security beyond whatever security measures were used at the point of entry to the network. In large network there may thus be hundreds of applications, devices, services, and data repositories (especially for legacy applications and data systems that were implemented without adequate security measures) that are exposed to malicious activity resulting from a breach that occurred when a single set of MFA credential are compromised, or when only a password (or no password) is used to secure the access.

SUMMARY

Discloses herein are methods, systems, media, and other implementations directed to network security, including implementations for auditing, identifying, and mitigating network security vulnerabilities, and implementations of network security protocols.

In some variations, a method is provided that includes monitoring dataflow streams in a network comprising multiple computing nodes, and determining network security characteristics for a dataflow stream, from the monitored dataflow streams, relating to security, authentication, and access events for accessing, via the dataflow stream, one or more of the multiple nodes of the network. The method further includes determining potential violations by the dataflow stream of one or more security policies defined for operation of the network, access functionality for the network, or identity attributes used by the network, based, at least in part, on the determined network security characteristics for the dataflow stream, and based on network-operation data comprising one or more of network security data, network identity data, and network access data. The network-operation data is stored in one or more data storage units in the network, and is configured to manage network access and operation for the multiple computing nodes of the network.

Embodiments of the method may include at least some of the features described in the present disclosure, including one or more of the following features.

The network operation data may include data relating to one or more of, for example, user authentication and authorization information for a plurality of users accessing the network, the identity and access security policies, user identification information for the plurality of users, and/or node information relating to characteristics of the multiple computing nodes of the network.

Monitoring the dataflow streams may include deriving map data of at least some of the monitored dataflow streams in the network, including deriving path and access information, for the at least some of the monitored dataflow streams, between respective groups of nodes in the network.

The method may further include generating, based on one or more of the map data, the network operation data, the determined network security characteristics, or the determined potential violations, a dynamic graph representative of dataflow access activity, at any particular time instance, within the network, with the dynamic graph including information representative of one or more of, for example, i) a number of the at least some of the monitored dataflow streams, ii) classes of destination nodes being accessed by the at least some of the multiple nodes, and/or iii) information representative of potential violations by the at least some of the multiple nodes of the security policies of the network.

The method may further include performing one or more mitigation actions in response to a determination of a security policy violation by the dataflow stream.

Performing the one or more mitigation actions may include one or more of, for example, a) sending a notification to a user associated with the dataflow stream or one or more of the nodes to establish new security credentials for accessing one or more of the multiple computing nodes of the network, b) suspending access of the user associated with the dataflow stream, c) establishing a multi-factor authentication procedure for the dataflow stream or for the user associated with the dataflow stream, d) randomizing a password of the user, e) modifying access privileges of the user to services and one or more of the multiple computing nodes on the network, f) modifying security parameters for the one or more of the multiple computing nodes, and/or g) modifying security parameters of the network.

Performing the one or more mitigation actions may include identifying one or more security violations corresponding to the determined security policy violation by the dataflow stream, and invoking one or more processes, selected from a plurality of pre-defined playbook processes implementing security access modifications applied to target dataflow streams, to modify security and access requirements responsive to the identified security violations.

The method may further include adaptively establishing a complementary access process to manage access to one of multiple nodes in response to a determination that access to the one of the multiple nodes does not satisfy security requirements associated with the node.

Adaptively establishing the complementary access process may include adaptively establishing the access process to manage access to the one of the multiple computing nodes having a computed authentication and access strength metric below a pre-determined threshold.

Determining the network security characteristics may include determining the security characteristics using one or more learning and artificial intelligence-based engines.

The network may include one or more portals to manage network access between the network and remote nodes associated with different one or more networks. Determining the potential violations by the dataflow stream may include identifying unmanaged access between one of the remote nodes and one of the multiple computing nodes of the network that bypasses the one or more portals.

Determining the potential violations by the dataflow stream may include one or more of, for example, determining whether security credentials associated with the dataflow stream are compromised, determining whether strength level of the security credentials satisfies required security credentials strength criteria for the associated dataflow stream, and/or determining whether encryption level of data communicated via the dataflow steam satisfies encryption requirement criteria for the associated dataflow stream.

The method may further include invoking, in response to a determination that the security credentials are compromised or that the strength level of the security credentials fails to satisfy the required security credential strength criteria, a process to cause, based on input provided by a user associated with the dataflow stream, modification of current security credentials to increase strength of the current security credentials associated with the dataflow stream, and/or to increase number of authentication factors used in association with the dataflow stream.

The network-operation data stored in the one or more data storage units in the network may be stored in one or more network-operation data directories implemented in the network.

Determining potential violations by the dataflow stream of one or more security policies may include one or more of, for example, determining whether an identity access was initiated from a real user account or from a machine-run service/robo account, determining anomalous behavior associated with an access attempt of the network, determining that user-attempted access of a service implemented on the network requires credential randomization for an accessing user, and/or determining existence of dormant and/or forgotten accounts.

In some variations, a system is provided that includes a network comprising one or more computing nodes, and a processor-based controller unit (which may have a distributed configuration, e.g., comprising a local flow sensor and a remote cloud server) configured to monitor dataflow streams in the network, and determine network security characteristics for a dataflow stream, from the monitored dataflow streams, relating to security, authentication, and access events for accessing, via the dataflow stream, one or more of the multiple nodes of the network. The controller unit is further configured to determine potential violations by the dataflow stream of one or more security policies defined for operation of the network, access functionality for the network, or identity attributes used by the network, based, at least in part, on the determined network security characteristics for the dataflow stream, and based on network-operation data comprising one or more of network security data, network identity data, and network access data. The network-operation data is stored in one or more data storage units in the network, and is configured to manage network access and operation for the multiple computing nodes of the network.

In some variations, a non-transitory computer-readable media is provided, that includes computer instructions executable on one or more processor-based devices to monitor dataflow streams in a network comprising multiple computing nodes, and determine network security characteristics for a dataflow stream, from the monitored dataflow streams, relating to security, authentication, and access events for accessing, via the dataflow stream, one or more of the multiple nodes of the network. The computer instructions are further configured to determine potential violations by the dataflow stream of one or more security policies defined for operation of the network, access functionality for the network, or identity attributes used by the network, based, at least in part, on the determined network security characteristics for the dataflow stream, and based on network-operation data comprising one or more of network security data, network identity data, and network access data. The network-operation data is stored in one or more data storage units in the network, and is configured to manage network access and operation for the multiple computing nodes of the network.

Embodiments of the system and computer-readable media above may include at least some of the features described in the present disclosure, including at least some of the features described above in relation to the method.

Other features and advantages of the invention are apparent from the following description, and from the claims.

BRIEF DESCRIPTION OF THE DRAWINGS

These and other aspects will now be described in detail with reference to the following drawings.

FIGS. 2A-1 and 2A-2 include a diagram of an example system on which agent nodes are deployed.

FIGS. 2B-1 and 2B-2 include a flow diagram showing an example authentication procedure.

FIG. 8 is flowchart of an example procedure to implement security processing.

Like reference symbols in the various drawings indicate like elements.

DESCRIPTION

Figure 1:
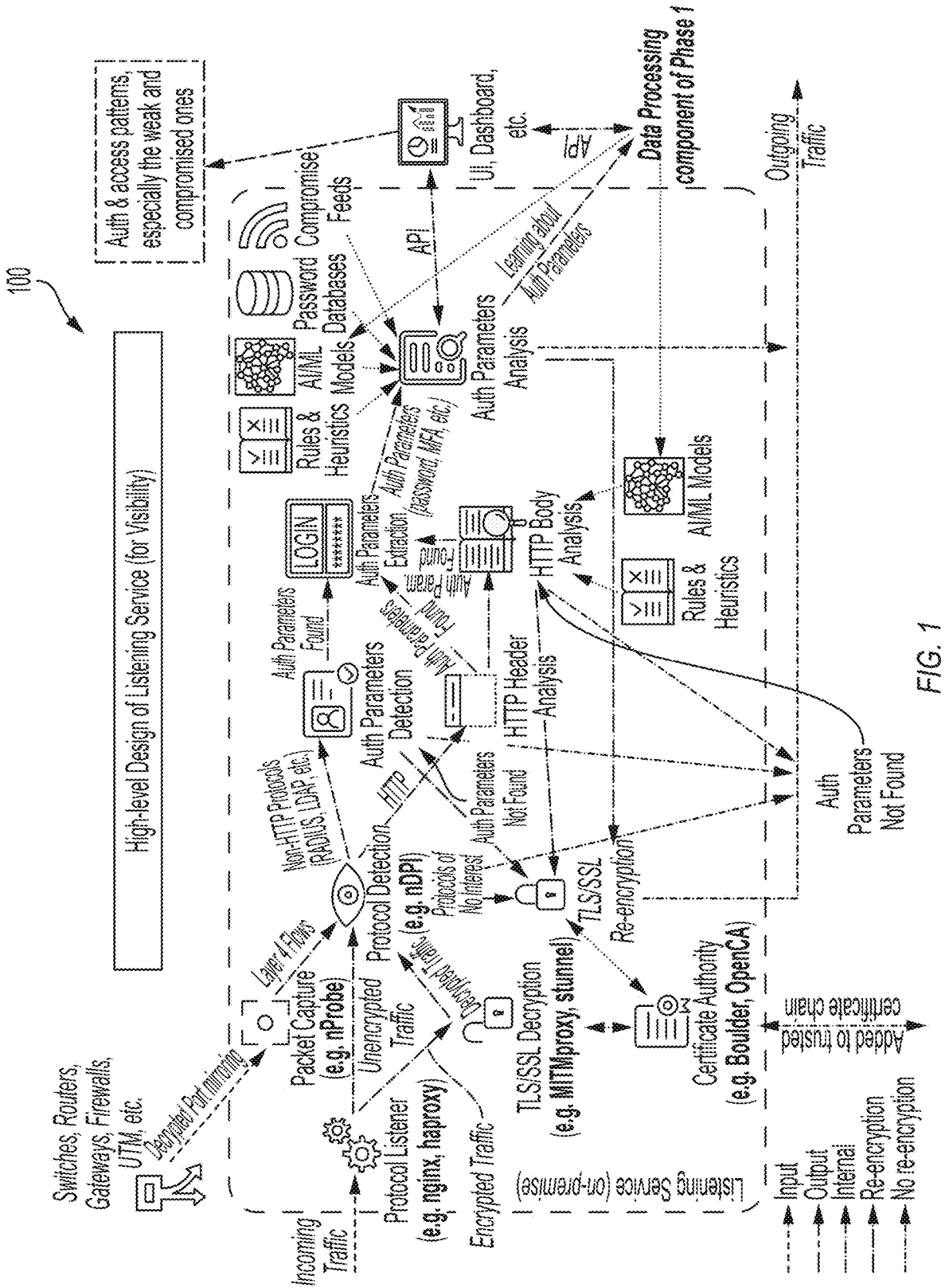
FIG. 1 is diagram of an example system that includes a listening (intercepting) service.

The present disclosure describes implementations to detect security vulnerabilities in networks and to mitigate such vulnerabilities through techniques and approaches for establishing security protocols in existing applications and modules deployed in the network. Aspects of the implementations include an instant proactive MFA system comprising orchestrated authentication agents (also referred to as "services" or "proxies") that capture related authentication sessions, and take over the sessions for adaptive analysis, credential management, and MFA, as needed. These agents work in sync with network authentication flow analysis components in order to identify security gaps. The implementations described herein also include an HTTP/S MFA system configured to perform authentication identification, capture and MFA "take over" execution, and directory password randomize solutions with change/injection. In additional examples, some implementations further include artificial-intelligence (AI)-based continuous deep learning adaptive authentication solutions that are configured to perform ongoing learning of access flows, access patterns, user access behavior, credentials, risk assessment, external identity vulnerabilities, and more. These AI/ML-based solutions allow global learning of systems/IOT pattern authentications and detection of anomalies.

Additional aspects described in the present disclosure also relate to security protocols, including implementations of multi-party computation (MPC)-based or secret-sharing-based MFA for passwordless systems. Such systems are configured to share a password or a key on a device, a PC, and/or a server, and to use SMS-based solutions. In some examples of the security protocols disclosed herein, a story-based access protocol, for mobile and non-mobile devices, is used.

As noted, some of the implementations described herein include AI/ML-based systems for discovery of security vulnerabilities and adaptive authentication. In some examples, such systems are configured to provide a security score for a network (e.g., on a 0-100 scale). The score may be based on such factors as the detection of anomalies (multiple denied accesses, hour exceptions, locations, etc.). The example system monitoring and studying network behavior can implement on-going learning of the security landscape of a network, and provide adaptive authentication solutions for portions of the networks determined to be vulnerable.

For example, in some embodiments, a system 100 (which may include an AI/ML-engine to perform at least some of the functions of the system) implements a listening service (also referred to as intercepting service) to discover weak authentication and other vulnerabilities. A diagram of an example system 100 that includes such a listening/intercepting and deep learning service is provided in FIG. 1. The listening service can detect high-level protocol from the incoming network traffic or packets from mirrored port or captured packets, and to forward traffic for further processing when incoming traffic is compatible with designated protocols (e.g., RADIUS, LDAP(S), Kerberos, HTTP(S)). For this, the system can use techniques like protocol detection or Deep Packet Inspection (DPI). In some embodiments, compatible protocols for incoming traffic may be those protocols that implement some form of authentication or access parameters (like passwords). In some examples, the listening service detects flows (e.g., of packets) related to authentication and access, and forwards only those authentication and access flows for further processing and analysis. In such situations, the service might need to decrypt the traffic using techniques like SSL/TLS inspection, custom certificates, and custom certificate authorities. This processing might also involve parsing and analysis of the protocol-level data and meta-data. The listening service identifies and extracts the username, password or other authentication or access related parameters within the flows/packets. To that end, the service may be configured to analyze the data and metadata within the flow/packets using one or more of techniques like data parsing, pre-defined rules, heuristics, and rules/models built using AI/ML.

The listening (intercepting) service (which can be implemented using a sensor device optionally in communication with a local or remote server to facilitate the data analysis and mitigation functionalities) determines the strength and other properties of the authentication/access tools being used. This can be accomplished, for example, by analyzing the password or other parameters (e.g., OTP, PIN, hashes, codes, tokens) using one or more of techniques like pre-defined rules, heuristics, databases/feeds of known and compromised passwords, and models/rules built using AI/ML. The listening service presents what it learned to the user, or forwards analyzed data for further processing. The various processes of the listening service can be driven or controlled using policies, rules or instructions from the user or a central server.

The listening/intercepting service is also configured to remedy/mitigate any vulnerabilities or security gaps detected through inspection of the infrastructure and data flows, so as to fortify any authentication/access weaknesses. This can be achieved by the service implementing one or more network security processes and techniques, such as adaptive/risk-based authentication, multi-factor authentication (MFA), passwordless authentication, zero trust and secure access tokens, or by integrating third-party solutions from vendors/partners that provide such implementations.

The listening service described herein can be organized into three phases. In a first phase, the infrastructure of a network (comprising multiple nodes running multiple applications) is mapped. This phase includes passively scanning network traffic (e.g., port mirroring), packet capture dumps, and/or network logs (e.g., NetFlow) to determine flows for protocols of interest (like RADIUS, LDAP and HTTP). The phase also includes detecting applications, devices, endpoints, and users of the flows, with the help of directories (e.g., AD), CMDB (e.g., ServiceNow), and/or other data sources, and determining targets and common sources for authentication and access.

The second phase of the listening service includes the discovery, analysis, and learning the flows and patterns for authentication and access. This phase includes deploying protocol services (e.g., HTTP or RADIUS Service) in listening mode for targets and, if required, for sources, decrypting and analyzing protocol traffic, learning usage and other properties (like strength, suitability and vendor) of passwords and MFA, identifying compromised parameters, and learning authentication and access patterns across apps, devices, users and time. The third phase involves recommending and applying policies. This phase includes uploading flows and patterns (anonymized) to the global database for better learning and recommendations, determining "red flags" (e.g., gaps, anomalies) in the flows and patterns, computing/determining the recommended remediation(s) (e.g., policies, locations of injection services, etc.), inserting protocol services in injection mode in the infrastructure, and applying policies.

Thus, some approaches described herein include monitoring data flow streams in a network comprising multiple computing nodes, detecting from the dataflow streams authentication data relating to authentication and access events for accessing one or more of the multiple nodes of the network, and determining security characteristics of the network based, at least in part, on the detected authentication data relating to the authentication and access events for accessing the one or more of the multiple nodes, and/or based on the network operation data (including access data) stored in various storage directories. In some examples, the methods may further include adaptively invoking an access process to manage access to one of the one or more of the multiple nodes determined, based on the security characteristics of the network, to be insecure.

In some examples, determining the network security characteristics, as well as potential security policy violations (of network security policies instituted by a particular network) may include determining the security characteristics, policy violations, etc., using one or more trained learning engines. Such machine learning engines (which may be implemented at one of the computing nodes of the network) could be initially trained using a training set that includes ground truths of dataflows having different characteristics (resulting in output of the learning engines representative of the particular characteristics identified). For example, some samples of the training set correspond to policy violations behavior, while other samples correspond to activity or behavior that is deemed to conform (and thus to not violate) the various security protocols in place. The output generated by such learning engines may then be used to decide what mitigation operations (if any) to implement in response to particular input set (representative of detected dataflow streams). Learning engines may be implemented using neural networks that are based on different types of neural network architectures, configuration, and/or implementation approaches. Examples neural networks that may be used include convolutional neural network (CNN), feed-forward neural networks, recurrent neural networks (RNN), etc. Feed-forward networks include one or more layers of nodes ("neurons" or "learning elements") with connections to one or more portions of the input data. Neural networks can be implemented on any computing platform, including computing platforms that include one or more microprocessors, microcontrollers, and/or digital signal processors that provide processing functionality, as well as other computation and control functionality. The computing platform can include one or more CPU's, one or more graphics processing units (GPU's, such as NVIDIA GPU's, which can be programmed according to, for example, a CUDA C platform), and may also include special purpose logic circuitry, e.g., an FPGA (field programmable gate array), an ASIC (application-specific integrated circuit), a DSP processor, an accelerated processing unit (APU), an application processor, customized dedicated circuitry, etc., to implement, at least in part, the processes and functionality for the neural networks. The computing platforms used to implement the neural networks typically also include memory for storing data and software instructions for executing programmed functionality within the device. Generally speaking, a computer accessible storage medium may include any non-transitory storage media accessible by a computer during use to provide instructions and/or data to the computer. For example, a computer accessible storage medium may include storage media such as magnetic or optical disks and semiconductor (solid-state) memories, DRAM, SRAM, etc. The various learning processes may be configured or programmed using TensorFlow (an open-source software library used for machine learning applications such as neural networks). Other programming platforms that can be employed include keras (an open-source neural network library) building blocks, NumPy (an open-source programming library useful for realizing modules to process arrays) building blocks, etc.

Figures 1, 2A:
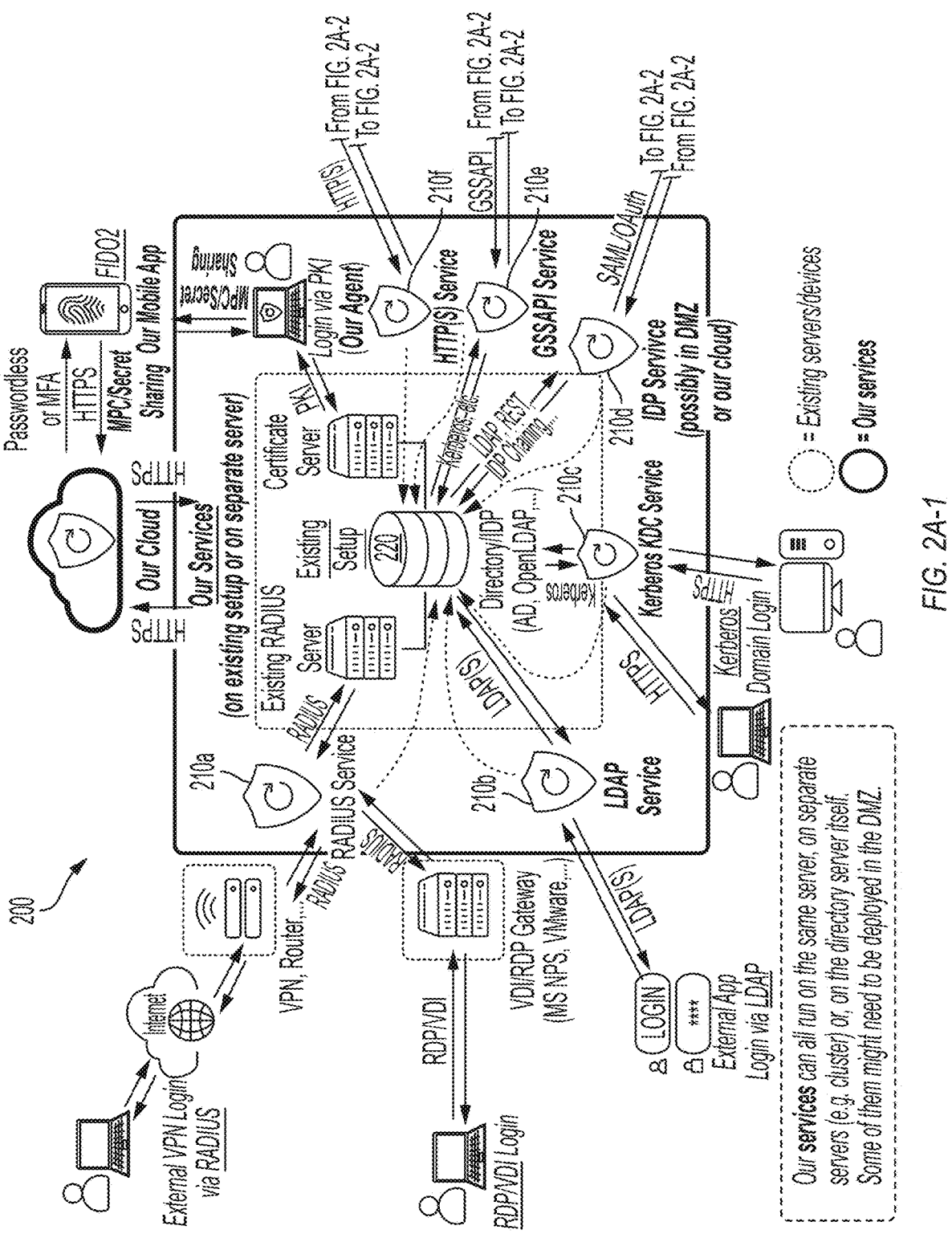
Figures 2, 2A:
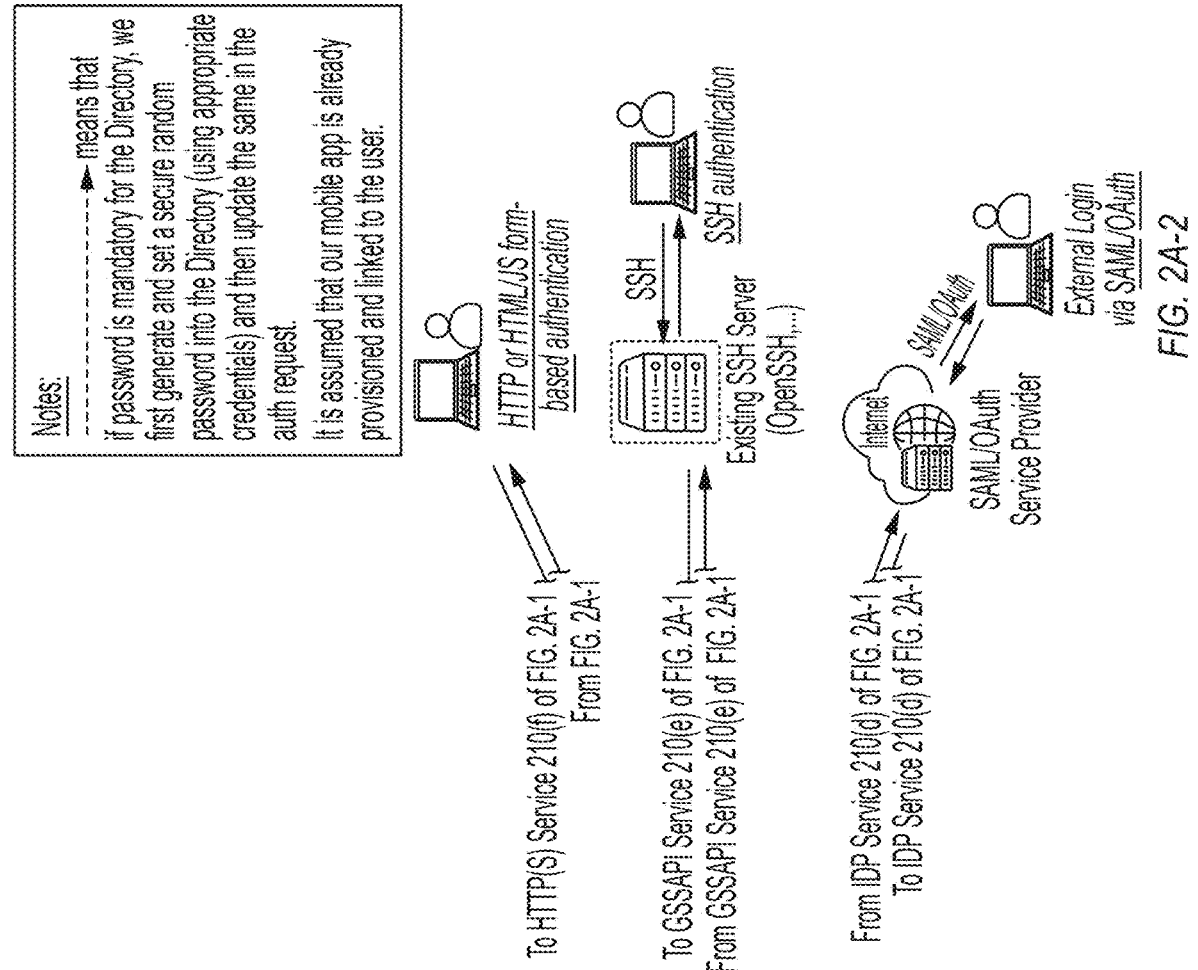

The mitigation functionality of the implementations described herein includes deploying agents (sometimes referred to as proxies or services), implemented in software and/or hardware, to serve as intermediary points between a user's station and the organization directory, vulnerable applications/services/devices, web servers or related systems (as may have been determined during the infrastructure mapping phase). The agents implement complementary authentication procedures that would otherwise may not be available at the applications/services/devices. FIGS. 2A-1 and 2A-2 show a schematic diagram of a system 200 on which agent nodes 210a-f, implementing augmented (retrofitted) authentication functionality have been deployed. It is to be noted that in such embodiments, if a password is mandatory for accessing a directory (e.g., realized at a memory device 220), a secure random password may be generated and set for access into the directory (using appropriate credentials), and the authentication request is then updated accordingly.

Figures 1, 2B:
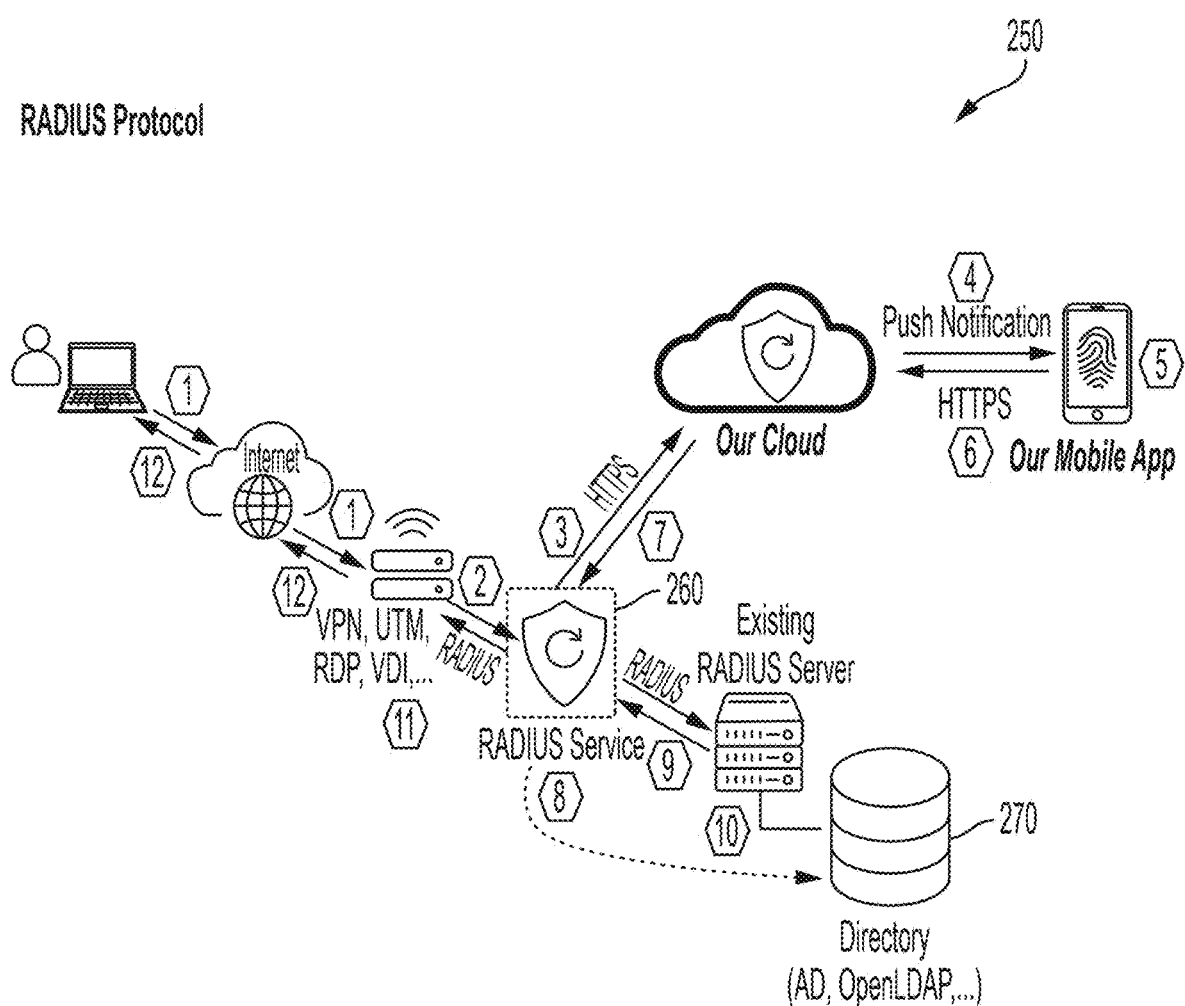

FIGS. 2B-1 and 2B-2 include a flow diagram 250 showing an example authentication procedure implemented for one such intermediary node (in this example, a RADIUS service intermediary agent 260, which may be similar to the agent 210a shown in FIG. 2A-1) coupled to an otherwise vulnerable service (in this example, a RADIUS service whose existing authentication protocol may have been determined to be deficient for the particular network monitored). In operation, a user may initiate (as illustrated by the arrow marked "1") an authentication request. The request is intercepted (at the arrow "2") by the agent 260, which recognizes that request as being a RADIUS request (which must adhere to some particular security policy or protocol for the particular network in question), and implements a passwordless authentication procedure (e.g., based on an MFA procedure, as shown in arrow "3"). It is to be noted that the agent 260 may have been added as an intermediary agent in response to an earlier determination of some security vulnerability involving RADIUS dataflow stream from the specific user (or from any user) initiating the example authentication request(s). The security procedure initiated by the agent 260 causes the MFA request to be directed to a cloud security server (such as the server 350 discussed below with respect to FIG. 3), which in turn causes a push request to be sent to the user's mobile device (as illustrated by the arrow "4"). The user provides, via the mobile device (marked as device "5"), passwordless authentication information (e.g., by way of biometric verification/authentication data), and the authentication response message is sent (at arrow "6") to the cloud server 350, which forwards to the agent 260 the passwordless/MFA response (at the arrow "7") to determine whether the user provided the correct authentication information.

As further shown in FIGS. 2B-1 and 2B-2, in some examples, the agent 260 may further determine (at the arrow "8", based on the particular of the request sent at the arrow "1") that the access request would access a directory 270, and that access to such as a directory requires a password (potentially a strong password). The agent 260, optionally in conjunction with the cloud server, generates and sets (or may have done so at an earlier point) a secure random password process, and thus the agent 260 updates the directory 270 with particulars of the security credentials or information that would be needed for the current authentication request to be able to access the directory 270. When the security procedure for accessing the directory has been established (contemporaneously or earlier), the authentication request from the user is forwarded (at the arrows "9") to the existing RADIUS server, with the generated random password potentially injected (by the agent 260) into the authentication request. The authentication request is then authenticated at the directory (at the line "10"), and the RADIUS server then sends a RADIUS response (at arrow "11"), resulting in an authentication response (at the arrow "12") forwarded to the user.

In some examples, securing weak authentication using an intercepting service may be implemented as follows. An intercepting service detects the higher-level protocol from the incoming network traffic and forwards traffic only for protocols of interest (e.g., RADIUS, LDAP(S), Kerberos, HTTP(S)) for further processing. For this, techniques like protocol detection or Deep Packet Inspection (DPI) may be used. The protocols of interest may be those that might contain some form of authentication or access parameters (like passwords). The service detects the flows (or packets) related to authentication and access and, forwards only them for further processing. For this, decryption operations may need to be applied to network traffic using techniques like SSL/TLS inspection, custom certificates, and custom certificate authorities. This processing might also involve parsing and analysis of the protocol-level data and metadata. The service identifies and extracts the username, password or other authentication or access related parameters within the flows/packets. This can be realized, for example, by analyzing the data and metadata within the flow/packets using one or more of techniques like data parsing, pre-defined rules, heuristics, and rules/models bult using AI/ML. Based on the authentication/access parameters, the service determines (e.g., based on pre-defined rules, heuristics, industry best practices, guidelines, and learned AI/ML models) whether the authentication or access flow needs to be secured (possibly supplementally, through the adaptive addition of a security procedure). The service secures the weak authentication/access flow by implementing one or more techniques like adaptive/risk-based authentication, multi-factor authentication (MFA), passwordless authentication, zero trust and secure access tokens, or by integrating services from other vendors/partners that provide such implementations. All the steps above can be driven or controlled using policies, rules, or instructions from a user or a central server.

In some examples, securing weak authentication when passwords are mandatory may be implemented as follows. The intercepting service detects the higher-level protocol from the incoming network traffic and forwards traffic only for protocols of interest (e.g., RADIUS, LDAP(S), Kerberos, HTTP(S)) for further processing. This can be achieved using techniques like protocol detection or Deep Packet Inspection (DPI). As noted, protocols of interest are those that might contain some form of authentication or access parameters (like passwords). The service detects the flows (or packets) related to authentication and access and, forwards only them for further processing. For this, the service might need to decrypt the traffic using techniques like SSL/TLS inspection, custom certificates, and custom certificate authorities. This processing might also involve parsing and analysis of the protocol-level data and metadata. The service identifies and extracts the username, password or other authentication or access related parameters within the flows/packets. This can be accomplished through analysis of the data and metadata within the flow/packets using one or more of techniques like data parsing, pre-defined rules, heuristics, and rules/models built using AI/ML. The service generates a secure random password and updates it in the authentication/access target. Instead of or in addition to password, the service might also update other parameters like OTP, tokens, and/or hashes. The target for authentication/access could be a directory (e.g., Active Directory), an identity provider (e.g., Okta), an access broker/Service (e.g., SAML Service), or any other database/service. The service will need to update privileges and/or credentials for the target. The service updates the authentication/access flow with the password generated in previous steps and, forwards it to the authentication/access target. Instead of or in addition to password protection, the service might also update other parameters like OTP, tokens, and/or hashes. All the steps above can be driven or controlled using policies, rules or instructions from the user or a central server.

Thus, in some embodiments, the security remediation solutions described herein include obtaining security characteristics of a network comprising multiple computing nodes, with the security characteristics including vulnerability information indicative of strength levels of authentication and access procedures used by one or more of the multiple computing nodes. The method further includes adaptively invoking a complementary access process to manage access to one computing node of the one or more of the multiple computing nodes determined, based on the security characteristics of the network, to be implementing a weak authentication and access procedure. In some examples, adaptively invoking the complementary access process may include adaptively invoking the complementary access process to manage access to the one computing node with a derived authentication and access strength metric below a predetermined threshold.

Figure 3:
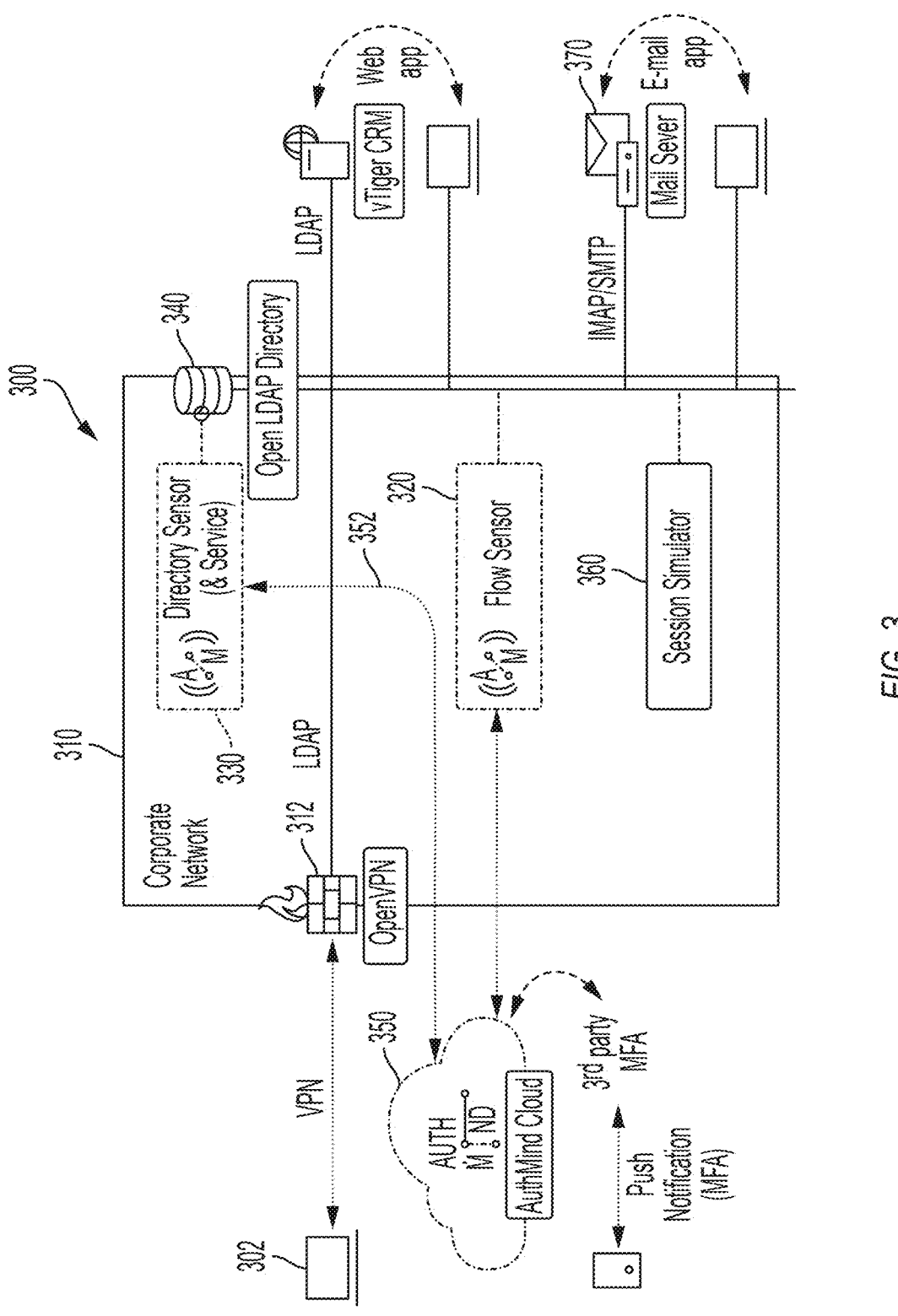
FIG. 3 is a schematic diagram of an example architecture to implement security monitoring and mitigation operations.

Additional embodiments of the network security monitoring and mitigation systems, techniques, and operations are illustrated and discussed in relation to FIG. 3, depicting a simplified example architecture 300 on which the approaches and solutions for monitoring and mitigating security risks and/or breaches are implemented. The example of FIG. 3 depicts an architecture implementing dataflow detection and determination of compliance of detected dataflows for to lightweight directory access protocol (LDAP) dataflows. Consider a scenario where a user terminal 302 may seek access to a VPN corporate network 310 via a portal (e.g., a firewall portal) 312 (referenced as OpenVPN) using a communication link that is based on LDAP. As shown, the network 310 includes a flow sensor 320 (which may be implemented on a computing device or node within the network 310) configured to intercept the initial access attempt and to perform an analysis on the access communication (e.g., using a trained learning engine, or based on established rules). The handling of the access request made by the terminal 302 is generally directed to a directory sensor 330 (which in this case is accessed via an LDAP directory sensor 330) configured to access and manage network operation data (including, for example, network security data, network identity data, network access data, and network functionality data) stored on an LDAP directory 340. The directory 340 may be implemented using one or more data storage devices/units, that may be distributed across the network 310, or even outside the network 310. If the access request can be validated (e.g., the access request provides the appropriate authentication credential) access to some or all of the services and apps available through the network 310 may be granted to the user at the terminal 302 (as specified by the network operation data stored at the directory 340).

In some embodiments, an access request will also be intercepted by a listening (intercepting) module 320, which, as discussed above, may be configured to perform discovery, analysis, and learning on flows and patterns for authentication and access. In the example of FIG. 3, the listening device 320 may be an LDAP flow sensor configured to detect LDAP-based flows. Whether or not the access request initiated from the terminal 302 is granted, the flow sensor 320 analyzes the access request to determine if the dataflow corresponding to the access request from the terminal 302 violates security policies (provided in the form of data records that may be stored on the directory 340) associated with the network 310 (such security policies can define required security levels to access various services or servers implemented on the network 310, define potential scenarios that would breach security requirements, etc.) Processing and analyzing the access requests to identify potential security policy violations may include extracting the username, password or other authentication or access related parameters within the flows/packets corresponding to the access request from the terminal 302. As noted above, this can be realized, for example, by analyzing the data and metadata within the flow/packets using one or more of techniques like data parsing, pre-defined rules, heuristics, and rules/models bult using AI/ML. The determination of whether any security policy violation has taken place generally also requires the flow sensor 320 to access the network operation data stored, for example, at the directory 340, to obtain network operation data that include the security policies defined for the network 310, user information (their credentials, access privileges, etc.), network data (e.g., characteristics, licensing information, importance, and sensitivity of certain services, etc.) As illustrated in FIG. 3, the flow sensor 320 has a direct link to the directory 340. However, in some embodiments, access to the directory 340 may be established through indirect links, e.g., via a dedicated link from an authorizer server such as an AuthMind™ cloud server 350. When a non-local server such as the server 350 is used to perform some of the security monitoring and mitigation operations described herein for the network 310, the server 350 can be also used to perform similar security monitoring and mitigation operations for other networks (not shown in FIG. 3).

Examples of potential security violations that the flow sensor 320 (possibly in conjunction with other computing/processing nodes, such as those available through the cloud server 350) is configured to analyze (based, in part, on characteristics of the dataflow, determined through extraction of relevant information from the dataflow) include:

Whether security credentials associated with the dataflow stream are compromised. This analysis may be based on alerts provided from third-party networks about potential data breaches that may impact one or more of the credentials used to access services, applications, and servers on the network 310.

Whether strength level of the security credentials satisfies required security credentials strength criteria for the associated dataflow stream. This analysis may be based on the specific service or application for which access being sought. Thus, different services with the network 310 may require different credential strengths (e.g., a sensitive service may require longer passwords, and/or other password strength criteria).

Whether encryption level of data communicated via the dataflow steam satisfies encryption requirement criteria for the associated dataflow stream.

Whether the access request requires credential randomization for an accessing user.

In some embodiments, the listening service (implemented on the flow sensor 320) may also be configured to identify anomalous behaviors associated with incoming data access requests or with established data links (following access grant). For example, the flow sensor 320 may be configured to determine whether an identity access was initiated from a real user account or from a machine-run service/robo account. Determination of anomalous behavior can be detected using machine-learned analysis, in which extracted information, such as security characteristics of the data flow (encryption protocol used, credentials associated with the data flow, metadata, and actual data payload/content associated with the dataflow, be it an initial access request, subsequent access attempts, or actual established data links) are processed by a learning engine trained and optimized to identify/recognize certain features as potentially anomalous (e.g., that an access request has a not insignificant likelihood of having originated from a robotic sender). The determination of anomalous behavior can be flagged for further analysis (e.g., by an administrator), or may cause invocation of more exacting remediation procedures than would ordinarily be required were the access requested determined to have originated from an actual live user (e.g., requiring biometric authentication from the sender).

Based on the analysis performed by the listening service (whether done locally at the flow sensor, or in conjunction with remote processing), a determination is made on whether any mitigation/remediation action is required. For example, in the example embodiment of FIG. 3, one or more mitigation actions may be performed (by the flow sensor 320, by a third-part remote server such as the AuthMind™ cloud server 350, or locally by a service or app implemented at the network). Examples of mitigation operations (which may be defined according to pre-determined playbooks that are invoked in response to the occurrence of certain situations) may include one or more of:

Sending a notification to a user associated with the dataflow stream or one or more of the nodes to establish new security credentials for accessing one or more of the multiple computing nodes of the network;

Suspending access of the user associated with the dataflow stream (this action may also depend on the seniority of the user involved; for example, access by the CEO of the entity, even if it breaches some security policy, may not necessarily cause suspension of the access);

Establishing a multi-factor authentication procedure for the dataflow stream or for the user associated with that dataflow stream;

Randomizing a password of the user;

Modifying access privileges of the user to services and one or more of the multiple computing nodes on the network;

Modifying security parameters for the one or more of the multiple computing nodes; and/or Modifying security parameters of the network.

In some examples, the network for which the access monitoring is being performed may not have initially established proper security measured needed for certain services or nodes that have been determined (during an initial mapping/landscape analysis to identify security weaknesses, or during on-going monitoring operations of network usage and access operations) to be lacking adequate security measures. For example, it may have been determined that a certain legacy service on the network has antiquated security measures that are no longer sufficient to meet security requirements. In such circumstances, the flow sensor 320, possibly in conjunction with processing available locally or at a remote server (such as the server 350) is configured to adaptively establish a complementary access process (implemented locally at the network 310, possibly at the flow sensor 320, or implemented remotely at the server 350) that acts as a proxy implementing a security interface for the node/point in the network having security deficiencies, in order to manage access to the service or server. For example, assume that an e-mail server 370 lacks multi-factor authentication (MFA) capabilities, which may not have been previously required, but under new security policies, MFA capabilities need to be realized. The security monitoring solution described herein (e.g., comprising the flow sensor 320 and the server 350) can automatically implement an MFA process (e.g., in response to determining that the e-mail server 370 requires MFA measures, or alternatively, in response to determining that a particular suspicious access request should be required to add MFA in order to access a service that ordinarily does not require MFA). In the example of FIG. 3, the server 350 establishes an MFA process that includes initially setting up an MFA for access to the particular service the terminal 302 wants to access, e.g., by having the user at the terminal 302 enroll for MFA authentication, and storing the MFA enrollment information in the directory 340 with which the server 350 can optionally communicate (via a link 352 to the directory sensor 330). The initial MFA enrollment information may include, for example, particulars of a mobile device associated with the access-requesting user, and the selected MFA that is to be used by the user to access the particular service. Subsequent to the enrollment, upon identifying an access request from an MFA enrolled user, the server 350 may send an MFA push notification to the previously identified mobile device in response to the flow sensor detecting access request by the terminal or specific user that have been enrolled.

Another example of a situation where the proposed approaches for security monitoring and mitigation processing can be used is when the network includes one or more portals (e.g., different than the portal 312 of FIG. 3) to manage network access between the network and remote nodes associated with different one or more networks. The approaches implemented herein are configured, in this example, to identify unmanaged access between one of the remote nodes and one of the multiple computing nodes of the network, that bypasses the one or more portals. This situation can occur when a user may have directly set up an account at, or established a direct connection to, another network (offering some service) without going through the network administrator (thus bypassing normal network-to-network policies that may be in place). In this example, the implementations described herein may remediate such unmanaged access by suspending or disabling any activity between nodes in the network and some other network that do not pass through authorized portals of the network. Alternatively, the cloud server (in conjunction with a flow sensor) may adaptively set up a proxy portal to intercept identified unmanaged communication links from the network, and require such links to pass through the proxy portal and adhere to the security requirements in place for communicating with external networks.

As noted, in some examples, the security monitoring and mitigation solutions are also configured to conduct an initial, and subsequent intermittent, survey of the network's infrastructure, and to identify security weaknesses and general characteristics of the security profile of the network (i.e., of the network 310 in the example of FIG. 3). The survey (also referred as mapping) of the network can be performed by passively scanning (e.g., over some pre-determined time interval) network traffic (e.g., port mirroring), packet capture dumps, and/or network logs (e.g., NetFlow) to determine flows for protocols of interest (e.g., RADIUS, LDAP and HTTP), and also detect applications, devices, endpoints, and users of the flows. Determination of the applications, users, and other characteristics of the network can be facilitated through accessing (e.g., by the flow sensor 320) of network operations directories, such as the LDAP directory 340 in the example of FIG. 3, to obtain data related to the configuration and security profile of the network. In some embodiments, other directories, such as the Active Directories (AD) of the network and/or its individual computing devices, a configuration management database (CMDB), and other data sources, can be accessed and audited to help determine the security profile and characteristics of the network. Audits of network operation data (available through directories such as the LDAP directory 340) can be used to not only identify the current security configuration of the network, but to also identify potential hidden issues such as the existence of dormant and forgotten accounts, temporary accounts, and other such issues.

As further depicted in FIG. 3, the network 310 may also include (or be coupled to) a session simulator 360 that may be used simulate session transactions, e.g., send messages to various nodes in the network 300, establish links between various nodes, and so on. The session simulator 360 is configured to test the liveliness of our system and generate reference flows that will aid in the mapping. The simulated network activity allows the flow sensor 320 to observe such network activity, and to thus perform at least part of the networking mapping functionality, in a generally safe environment (i.e., without requiring potentially dangerous outside communications to and from the network 310).

Figure 4:
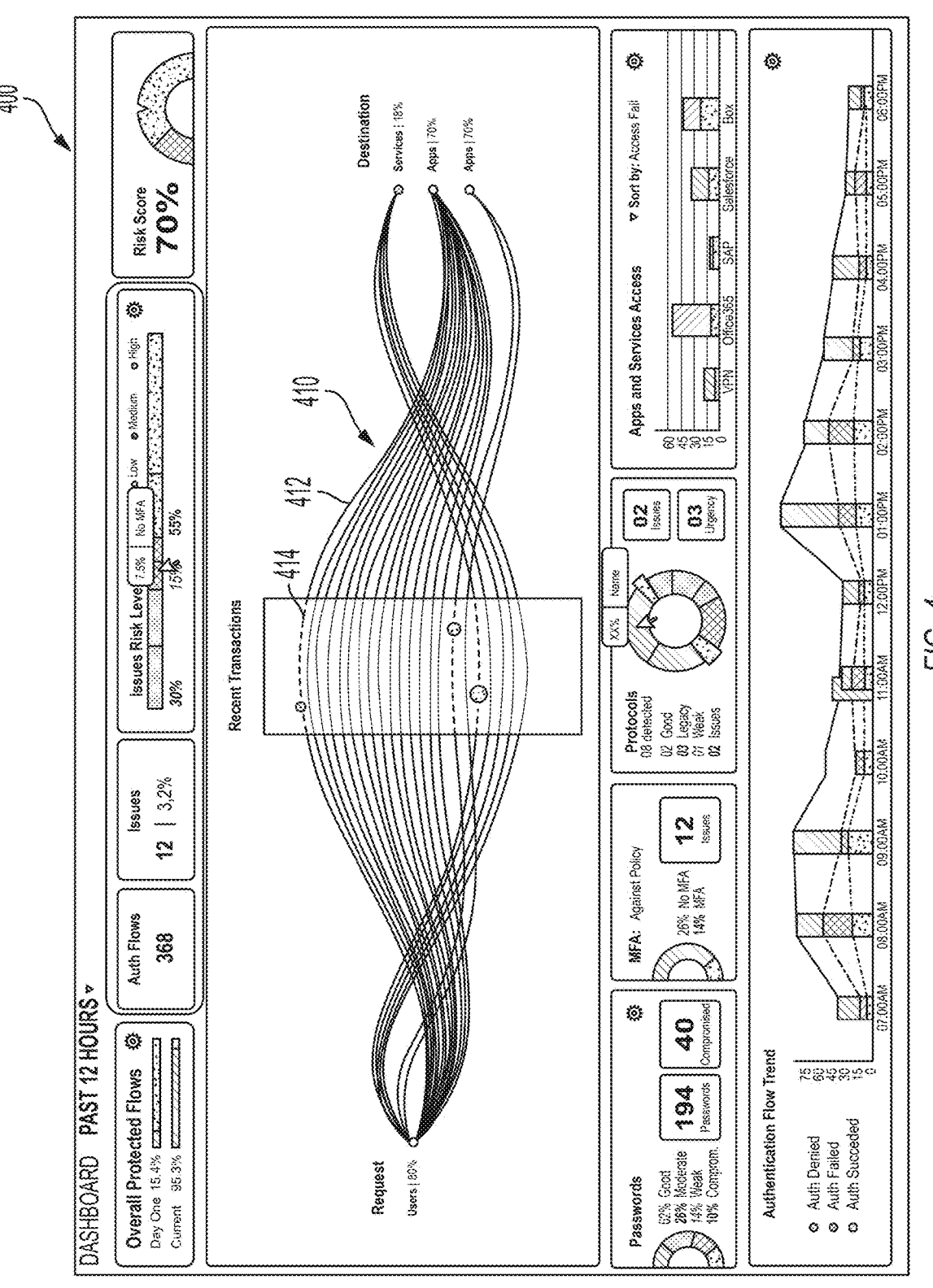
FIG. 4 is an example dynamic graph.

Mapping data and dataflow monitored data obtained by, at least in part, the flow sensor 320 can be used to generate a dynamic graph (that may be presented on a user interface or dashboard). Such a dynamic graph can provide a user (e.g., a network administrator) with salient visual information about the current status of the network being monitored (e.g., in terms of security-related activity, including number and identity of active network accesses, type of accesses), and flag, in real-time or near real-time, potential issues (such as security policy violations). With reference to FIG. 4, an example dashboard screen 400 that includes one type (of several different possible types) of a dynamic graph 410 is shown. The dynamic graph provides a visual representation (e.g., through wavy lines such as a line 412) of the number of dataflow streams that are active or that are being monitored. The number of wavy lines shown in the graph 410 may be the actual number of dataflow streams, or may represent a scale or proportion of the actual active streams (e.g., each wavy line may represent 100, 1000, or any other number of connections). As the characteristics of active streams change, the data provided through the dynamic graph 410 will also change to present dynamically, for any particular time instance, the true network activity and conditions. When a potential violation is detected, the wavy line representative of the affected stream can be identified (e.g., by changing the color or configuration of at least a portion of the line, as illustrated by the flagged line portion 414 in FIG. 4). Additional information provided through the dynamic graph 410 can include the types or classes of destinations (e.g., apps destinations, services destinations, etc.), a risk score, data about security policy compliance (e.g., the number of users using, respectively, good, moderate, weak, or compromised passwords), and other information germane for determining the overall security conditions of the network being monitored.

Figure 5:
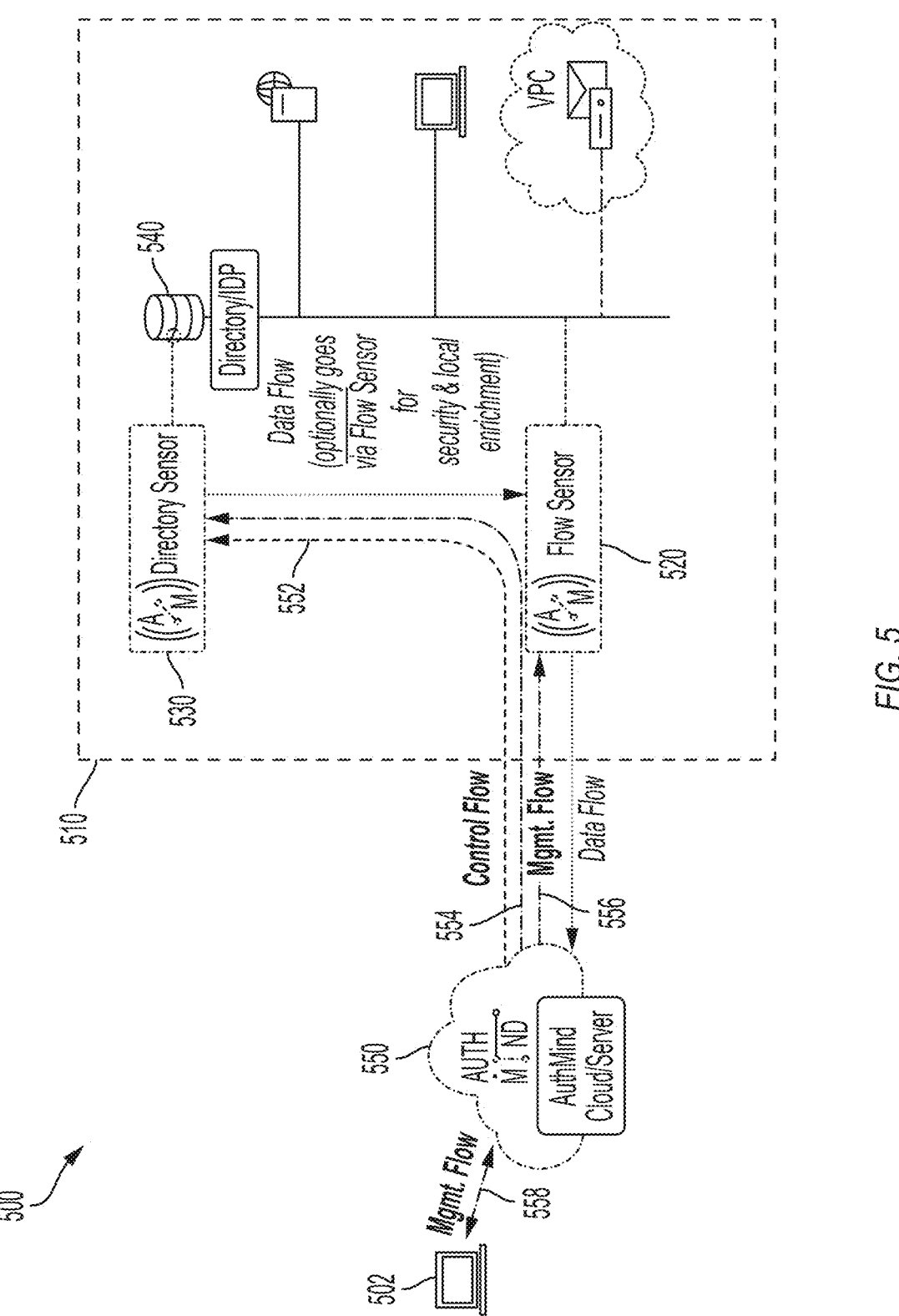
FIG. 5 is a diagram illustrating connectivity configuration between a cloud security server and part of a network.

As noted, in some embodiments, at least some of the processing to monitor security-related activity in a network, and to undertake appropriate corrective/mitigation actions in response thereto, is performed at a remote cloud server such as the 350 of FIG. 3. Such a cloud server (which may comprise one or more computing devices, with some of those devices being distributed devices) is adapted to serve multiple clients, and thus to monitor and perform security-related mitigation functions for multiple independent networks (each potentially controlled by a different entity). With reference to FIG. 5, a diagram of an example system 500, illustrating connectivity configuration between a cloud security server (which may be similar to the server 350 of FIG. 3) and part of a network 510 (which may be similar to the network 310 of FIG. 3), is shown. Assume that in the example system 500 of FIG. 5, the cloud server 550 performs at least some of the security-related analysis (including mapping the landscape of the network 310, determining potential policy violations, and invoking adaptive mitigation actions in response to detected issues). In some examples, the server 550 may act as a proxy or intermediary that interfaces between the network 510 and its users, and can establish security bridges that supplement any access control already implemented by the network. For example, the server 550 can, in response to detection of some security deficiencies (e.g., inadequate password protection that requires that the affected user add MFA, or lack of access control that requires implementing an authentication point to prevent/inhibit direct access of users to the network 510), communicate with remote users (or rather, their devices) to establish security measures on behalf of the network 510. In such embodiments, the server can establish an intermediary firewall that routes, at least some of the network access traffic through the server, and therefore establishes communication links between the server 550 and the security infrastructure of the network 510. For example, and as illustrated in FIG. 5, the server 550 establishes a control flow link 552 between the server 550 and a directory sensor 530 (which may be similar to the directory sensor 330 of FIG. 3) to transmit requests for security information (e.g., authentication information, user account information, security information relating to services and nodes operating on the network 530, etc.) stored in a network operation directory 540 (which, in some examples, may be similar to the directory 340 of FIG. 3), and to also, when needed, update information stored on the directory 540 (e.g., to update or add credentials, authentication information, etc.) The server 550 also established management flow links 554 (between the server 550 and the directory sensor 530) and 556 (between the server 550 and a flow sensor 520 that transfer data communications from the remote user (received at the server 550 via a link 558 to a remote terminal 502) to the network 510. Data that is to be sent back to the user at the terminal 502 is directed, in the example of FIG. 5, through the flow sensor. In such embodiments, the flow sensor 520 can, therefore, be configured to collect security related data used to perform security monitoring and mitigation functionality, and to also provide actual service data to the user (i.e., to send data generated or processes by one of the network's services or servers to the remote terminal 502 via the flow sensor 520 and the server 550.

Figure 6:
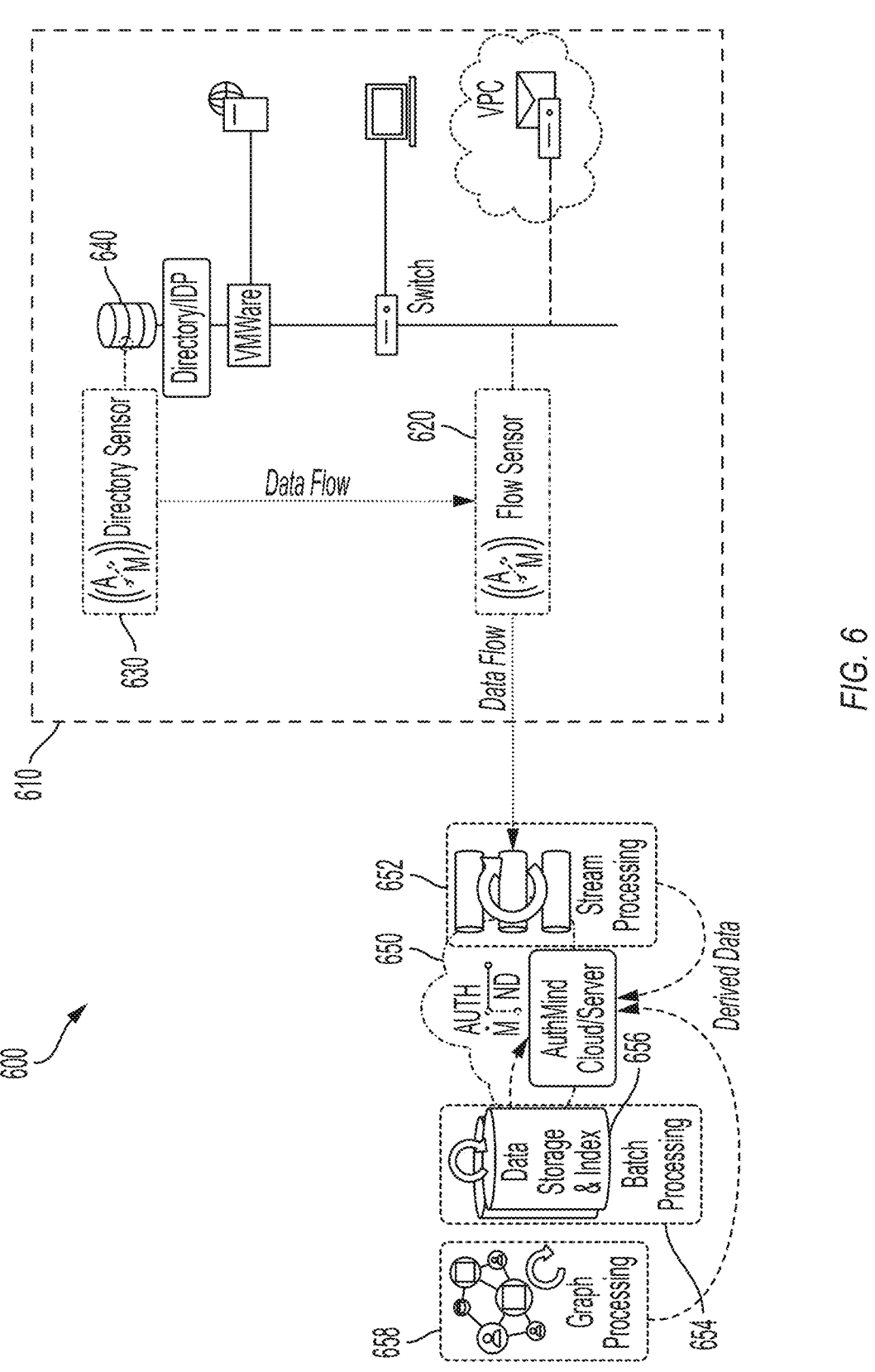
FIG. 6 is a diagram of a system that includes a cloud server with at least some of the logic sections/modules implemented at the server.

FIG. 6 is a diagram of a system 600 that includes a cloud server 650 (which may be similar to the cloud server 550 of FIG. 5), and which illustrates at least some of the logic sections (or modules) that are implemented at the server 650. Thus, for example, in embodiments in which the cloud server acts as a security interface (i.e., intermediary) between remote users and a network 610 (which may be similar to the network 510 of FIG. 5), the cloud server includes a streaming section 652 configured to process and manage dataflow streams between the network users and the various servers, services, and applications executed by the network 610. The streaming section may be configured to also implement any security measures that are required by security protocols and policies of the network 510, or that were implemented by the server (and/or a flow sensor 620, which may be similar to the flow sensor 520 of FIG. 5 or the flow sensor 320 of FIG. 3) in response to the security monitoring and mitigation operations performed by the processes and techniques described herein. The server 650 may further include a batch processing section 654 that is configured to perform the various security monitoring and mitigation solutions described herein in relation to FIGS. 1-5. Network operation data, including security-related activity and information, such as mapping and current and past activity by users accessing the network, can be stored in a data storage device 656 managed by the batch processing section 654. This data is used, in part, to perform future security analysis (that relies on historical data being stored), that in turn is used to perform, and adaptively optimize, the security monitoring and mitigation operations. As also depicted in FIG. 6, the server 650 may further include a graph processing section 658 that may be configured, for example, to process security-related data collected through the flow sensor 620 (e.g., monitoring data streams and security policy violations), and generate a dynamic graph, such as the graph 400 of FIG. 4, for rendering at a display device at a remote terminal or at a display device coupled to the server 650 (or to the network 610).

As discussed herein, in some embodiments, the security analysis and processing may be realized using a learning machine implementing a learning model to, for example, detect potential security policy violations, anomalous dataflow activities, and other anomalous events (e.g., access requests from automated or robo services, dataflow stream behavior indicating potential malicious activity, etc.) Thus, and with reference to FIG. 7, a diagram of a system 700 (which may be similar to the system 600) that includes a security monitoring and mitigation cloud server 750 (which may be similar to the server 650 of FIG. 6) is shown. The server 750 may include, similarly to the server 650, a stream processing section 752, a batch processing section 754 (comprising a storage device 756), and a graph processing section 758 (which may be similar to the section 658 of FIG. 6). Monitoring data collected by a flow sensor 720 (e.g., monitoring data for dataflow activities within the network, mapping data for the network's configuration and architecture, and/or data received from a directory 740, optionally via a directory sensor 730) is processed by one or more learning engine at an AI/ML (artificial intelligence/machine learning) section 760. The one or more learning engines receive as input data at least portions of current and historical security data (which may have been received from the flow sensor 720 and stored at the storage device 756, and which may also include graph data representative of current security related activity/behavior at the network 710), and analyze the data to detect policy violations, etc. The output of the AI/ML section 760 can include data indicating potential policy violations or normal behavior for various dataflow streams active in the network. The output can also include triggers for certain types of processes implementing certain playbooks of remediation/mitigation action in the event that some activity has been identified as violating a security policy. As noted, the learning engines can be implemented using neural networks, or any other machine learning architecture or technology.

Example approaches to monitor and mitigate security risks on a network such as the networks depicted in FIGS. 1-7 are further described with reference to FIG. 8, providing a flowchart of an example procedure 800 to implement security processing. The procedure 800 can be implemented using, for example, a flow sensor (such as the sensors 320, 520, 620, or 720) in combination with a cloud server (such as the servers 350, 550, 650, and 750 of FIGS. 3, 5, 6, and 7), but can in general be implemented on any computing device. The example procedure 800 includes monitoring 810 (e.g., by a flow sensor such as the flow sensor 320 and/or a cloud server such as the cloud server 350 of FIG. 3) dataflow streams in a network comprising multiple computing nodes. The example procedure 800 further includes determining 820 network security characteristics for a dataflow stream, from the monitored dataflow streams, relating to security, authentication, and access events for accessing, via the dataflow stream, one or more of the multiple nodes of the network. The procedure 800 additionally includes determining 830 potential violations by the dataflow stream of one or more security policies defined for operation of the network, access functionality for the network, or identity attributes used by the network, based, at least in part, on the determined network security characteristics for the dataflow stream, and based on network-operation data comprising one or more of, for example, network security data, network identity data, and network access data. The network-operation data is stored in one or more data storage units (e.g., the LDAP directory 340 of FIG. 3) in the network. The network operation data is configured to manage network access and operation for the multiple computing nodes of the network.

In some examples, the network operation data may include data relating to one or more of, for example, user authentication and authorization information for a plurality of users accessing the network, the identity and access security policies, user identification information for the plurality of users, and/or node information relating to characteristics of the multiple computing nodes of the network. In some embodiments, monitoring the dataflow streams may include deriving map data of at least some of the monitored dataflow streams in the network, including deriving path and access information, for the at least some of the monitored dataflow streams, between respective groups of nodes in the network. In such embodiments, the method may further include generating, based on one or more of, for example, the map data, the network operation data, the determined network security characteristics, and/or the determined potential violations, a dynamic graph (such as the dynamic graph depicted in FIG. 4) representative of dataflow access activity, at any particular time instance, within the network. The dynamic graph may include information representative of one or more of, for example, i) a number of the at least some of the monitored dataflow streams, ii) classes of destination nodes being accessed by the at least some of the multiple nodes, and/or iii) information representative of potential violations by the at least some of the multiple nodes of the security policies of the network.

In some embodiments, the procedure 800 may further include performing (e.g., by the cloud server, such as the server 350, and/or the flow sensor such as the sensor 320) one or more mitigation actions in response to a determination of a security policy violation by the dataflow stream. Performing the one or more mitigation actions may include one or more of, for example, a) sending a notification to a user associated with the dataflow stream or one or more of the nodes to establish new security credentials for accessing one or more of the multiple computing nodes of the network, b) suspending access of the user associated with the dataflow stream, c) establishing a multi-factor authentication procedure for the dataflow stream or for the user associated with the dataflow stream, d) randomizing a password of the user, e) modifying access privileges of the user to services and one or more of the multiple computing nodes on the network, f) modifying security parameters for the one or more of the multiple computing nodes, and/or g) modifying security parameters of the network. In some examples, performing the one or more mitigation actions may also include identifying one or more security violations corresponding to the determined security policy violation by the dataflow stream, and invoking one or more processes, selected from a plurality of pre-defined playbook processes implementing security access modifications applied to target dataflow streams, to modify security and access requirements responsive to the identified security violations.

The procedure 800 may further include adaptively establishing a complementary access process to manage access to one of multiple nodes in response to a determination that access to the one of the multiple nodes does not satisfy security requirements associated with the node. Adaptively establishing the complementary access process may include adaptively establishing the access process to manage access to the one of the multiple computing nodes having a computed authentication and access strength metric below a pre-determined threshold.

Figure 7:
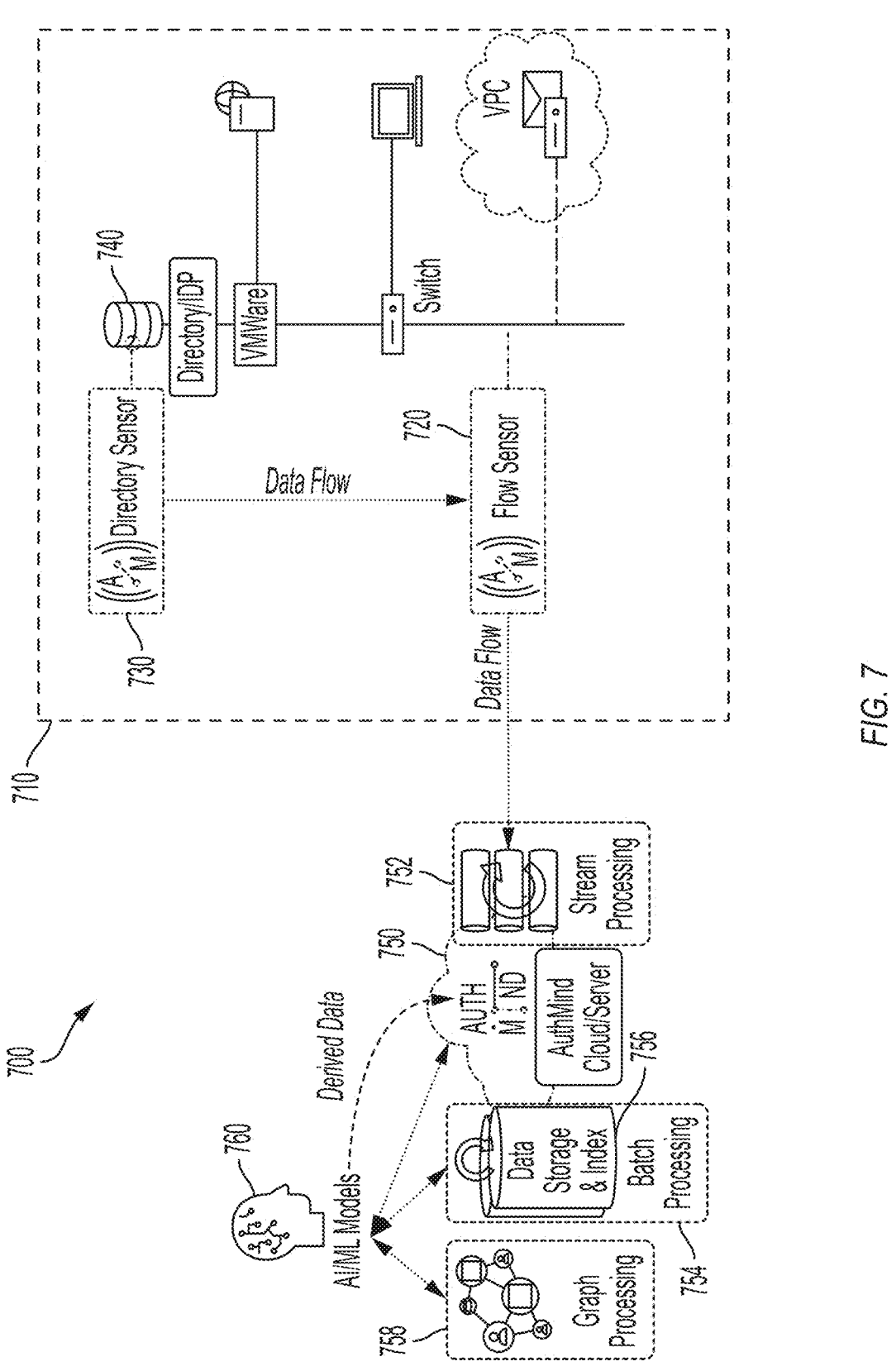
FIG. 7 is another a diagram of an example system that includes a security monitoring and mitigation cloud server.

In some embodiments, determining the network security characteristics may include determining the security characteristics using one or more learning and artificial intelligence-based engines (e.g., by the AI/ML section 760 of FIG. 7).

In some situations, the network includes one or more portals to manage network access between the network and remote nodes associated with different one or more networks. In such situations, determining the potential violations by the dataflow stream may include identifying unmanaged access between one of the remote nodes and one of the multiple computing nodes of the network that bypasses the one or more portals.

Determining the potential violations by the dataflow stream may also include one or more of, for example, determining whether security credentials associated with the dataflow stream are compromised, determining whether strength level of the security credentials satisfies required security credentials strength criteria for the associated dataflow stream, and/or determining whether encryption level of data communicated via the dataflow steam satisfies encryption requirement criteria for the associated dataflow stream. In such embodiments, the procedure may also include invoking, in response to a determination that the security credentials are compromised, or that the strength level of the security credentials fails to satisfy the required security credential strength criteria, a process to cause, based on input provided by a user associated with the dataflow stream, modification of current security credentials to increase strength of the current security credentials associated with the dataflow stream, or to increase number of authentication factors used in association with the dataflow stream.

The network-operation data stored in the one or more data storage units in the network may be stored in one or more network-operation data directories implemented in the network (e.g., the LDAP directory 340 of FIG. 3, the identity provider directory 740 of FIG. 7, etc.)

In some embodiments, determining potential violations by the dataflow stream of one or more security policies may include one or more of, for example, determining whether an identity access was initiated from a real user account or from a machine-run service/robo account, determining anomalous behavior associated with an access attempt of the network, determining that user-attempted access of a service implemented on the network requires credential randomization for an accessing user, and/or determining existence of dormant and forgotten accounts.

In some implementations, mitigation of security risks can include implementing an inventive secret-sharing or MPC based authentication through text messaging, without OTP/security code. In such implementations, a system and method are provided that allow secure (no OTP or other key exposure for sharing or hacking) authentication through text messaging/SMS. For this, the implemented solutions can use techniques like secret sharing or Multi Party Computation (MPC).

Figure 9:
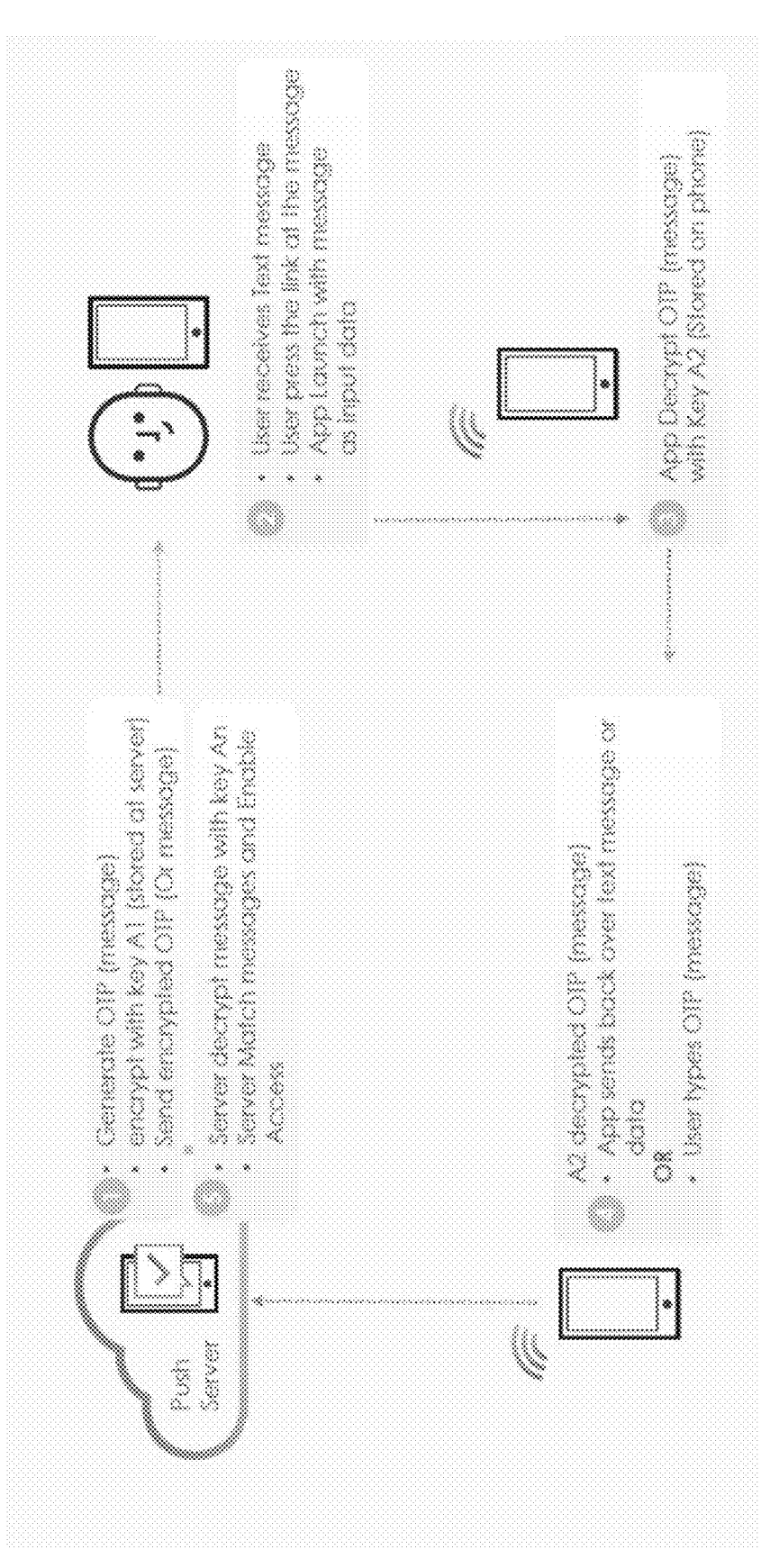
FIG. 9 is a schematic diagram of an example system implementing a secret-sharing based authentication technique.

A schematic diagram of an example system 900 implementing a secret-sharing based authentication technique described herein is provided in FIG. 9. The system 900 can be deployed as a cloud service or on premise. When a user is being authenticated, the system (server/cloud) sends an encrypted message to the user that includes a part of the back-end key/secret. The encryption is done using part of the MPC key or secret sharing key and sent to the user mobile device through, for example, a messaging system text/SMS, emails, WhatsApp communications, telegrams, signals, etc.

The user receives the encrypted message on his/her device. The user clicks on a link included in the message, or otherwise opens an authentication app. A pre-installed authentication app on the phone is launched and the code is read/injected into that. The app extracts the received encrypted message, processes it using MPC or secret sharing, and generates a response in the form of another encrypted message. The user might be optionally asked to verify his identify using the mobile device's biometric capabilities or other techniques like PIN, password, pattern, or story. The user presses a button on the app that either sends the response message back to the server through data or, through the text messaging channel or, through a QR code that the app provides.

Thus, in some embodiments, a procedure is provided that includes receiving at a device (by a user associated with the device), in response to an access attempt of an application requiring authentication and running at a remote server, a coded message encrypted according to a first key available at the receiving device, and decoding the coded message according to the first encryption key available at the device. The method further includes generating, in response to determining authenticity of the decoded message, a coded reply message according to a second key available at the remote server, and transmitting the coded reply message to the remote server. In some examples, the method may further include remotely accessing the application at the remote server upon authentication (by the remote server) of the coded reply message according to the second key. In some embodiments, the first key is a symmetric key that is same as the second key. In alternative embodiments, the first key is a private first key different from the second key, with the second key being a second private key, and with the coded message received at the device being encrypted according to a first public key corresponding to the first private key.

Another example security enhancing technique to mitigate detected security weaknesses and vulnerabilities is based on an approach to realize access-story-based authentication for computer systems and mobile devices/applications. In such implementations, a security system is configured to provide secure authentication through a user access story that only the user knows. A user will be authenticated by clicking/tapping a sequence of images and/or letters/words and/or icons, etc., that symbolize the user's story sequence. The system can be implemented to enable access to applications, devices, services, computers, phones, etc. When the user is first enrolled to the system, the user is asked to choose a story of N words, based on set of multiple images/icons/words/letters the user is shown (e.g., icons or letters representing a cat, dog, ice-cream, love, old mad, home, boat, etc.) For example, a user story can be a six-word story as "I love ice-cream at the sunset."

Figure 10:
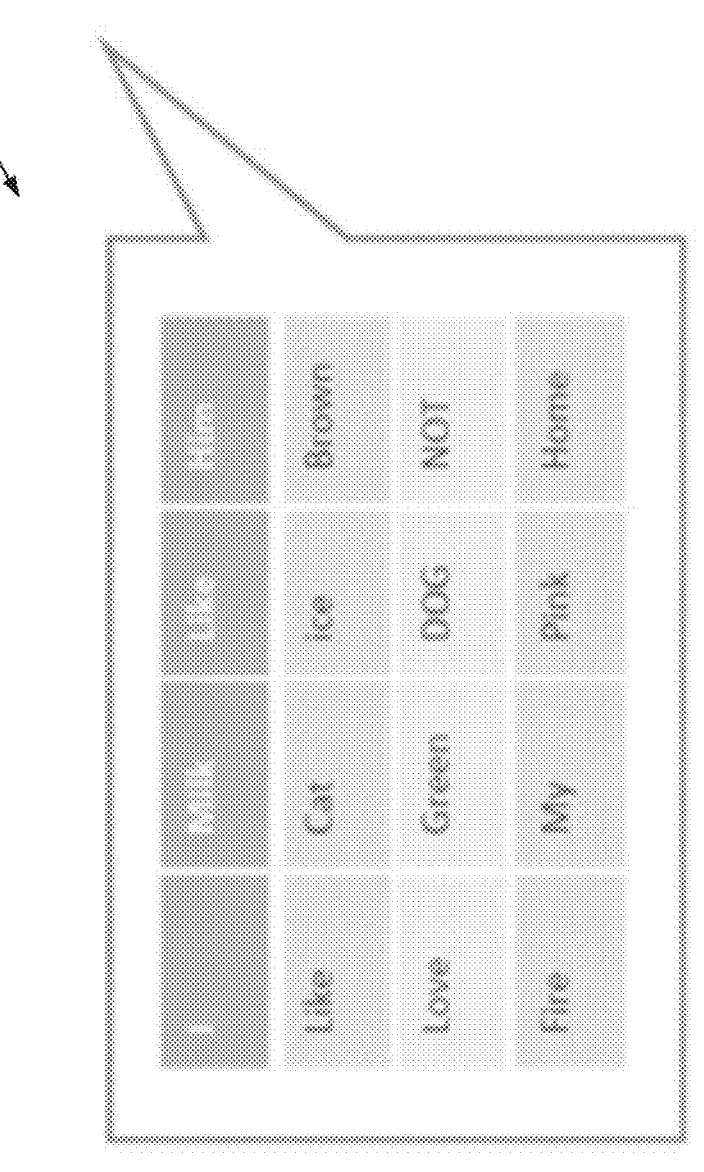
FIG. 10 is an example grid presented on a user interface to implement an enhanced user security access procedure.

Subsequently, when the user is being authenticated (in response to an attempt to access the system), the system's back-end generates a unique random one-time code. The back-end translates the code into a random one-time matrix scheme and sends the matrix scheme in clear, or with MPC, or secret sharing method to the user's device. The part of the system on the user endpoint then generates a random matrix based on the one-time matrix sent by the back-end and presents to the user a J×K grid (as an example, a 4-by-4 grid) that includes an image/word/icon/etc., at each location, including the images of the story the user chose (e.g., "I love ice-cream at the sunset"). In another example, in response to a randomized sequence generated for the expression "I love My Brown DOG ice" an example grid 1000, provided in FIG. 10, may be presented on a user device's interface.

The user presses or selects the symbols (icons/words/images, etc.) that represent his/her story. The images/icons, etc. will be presented at different locations for each authentication and/or authentication attempt. The endpoint reads the story and sends it back (optionally using encryption, or MPC, or secret sharing) to the back end. The back-end matches the user's story to the one stored to authenticate the user, and, if successfully matched (i.e., the story represented by the reply message equals the access story selected at the time of enrollment), the user will gain access to the related app/device/service.

Alternatively, the following approach can be implemented to apply the user story technique on an end point and for offline operation. The computer/device will present the user the story matrix just like the description above. The user's story is generated and presented in random locations on a matrix/grid. The user selects the related icons/words/images, etc., that represent his/her story. The access story is matched to a local story through a secured process and, if successfully matched, the user will gain access to the device/computer the user is seeking to access.

Thus, in some embodiments, a method (and/or system) is provided that includes receiving at a device, in response to an access attempt (by a user associated with the device) of an application requiring authentication and running at a remote server, a message with story data representative of a randomized order of multiple symbols generated based on a personalized message comprising a sequence of ordered symbols selected from a symbol dictionary during enrollment to the application. The approaches further include presenting on a user interface of the device the multiple symbols at respective locations on the user interface corresponding to the randomized order of the multiple symbols of the received message, generating a second order representative of a selection order of at least some of the symbols presented on the user interface, and accessing the application at the remote server in response to a match of the second order to the sequence of ordered symbols selected during enrollment. In some embodiments, the approaches may further include determining the match of the second order to the sequence of ordered symbols at one of the device, or the remote server. In some examples, the received message may be encrypted according to a key available at the device. In such examples, the method may further include decrypting the received message to recover the randomized order of the multiple symbols. In some examples, presenting the multiple symbols may include presenting the multiple symbols within respective cells in a J×K grid representation according to the randomized order of the multiple symbols.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limiting with respect to the scope of the appended claims, which follow. Any of the features of the disclosed embodiments can be combined with each other, rearranged, etc., and are within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method comprising:

monitoring, by at least one flow sensor, dataflow streams in a network comprising multiple computing nodes, wherein the at least one flow sensor is included in the network and is configured to monitor the dataflow streams and access-requests from remote user terminals;

determining network security characteristics for a dataflow stream, from the monitored dataflow streams, relating to security, authentication, and access events for accessing, via the dataflow stream, one or more of the multiple nodes of the network;

determining potential violations by the dataflow stream of one or more security policies defined for operation of the network, access functionality for the network, or identity attributes used by the network, based, at least in part, on the determined network security characteristics for the dataflow stream, and based on network-operation data comprising one or more of network security data, network identity data, and network access data, with the network-operation data being stored in one or more data storage units in the network, and configured to manage network access and operation for the multiple computing nodes of the network;

determining whether a legacy service, implemented on one or more of the multiple computing nodes of the network, satisfies current network security requirements associated with one or more of the multiple computing nodes on which the legacy service is implemented;

adaptively establishing, automatically by at the at least one flow sensor or at a non-local server different from the remote user terminals or the network, a complementary access process, the complementary access process acting as a proxy or intermediary service implementing a security interface to control access to the legacy service according to the current network security requirements, in response to determining that the legacy service does not satisfy the current network security requirements associated with the one or more of the multiple computing nodes having a computed authentication and access strength metric below a predetermined threshold; and applying, by the automatically adaptively established complementary access process, the current network security requirements to control access to the legacy service.

2. The method of claim 1, wherein adaptively establishing the complementary access process comprises adaptively establishing the access process to manage access to the legacy service, implemented on the one or more of the multiple computing nodes, having a computed authentication and access strength metric below a pre-determined threshold.

3. The method of claim 1, wherein monitoring the dataflow streams comprises:

deriving map data of at least some of the monitored dataflow streams in the network, including deriving path and access information, for the at least some of the monitored dataflow streams, between respective groups of nodes in the network; and generating, based on one or more of the map data, the network operation data, the determined network security characteristics, or the determined potential violations, a dynamic graph representative of dataflow access activity, at any particular time instance, within the network, the dynamic graph including information representative of one or more of: i) a number of the at least some of the monitored dataflow streams, ii) classes of destination nodes being accessed by at least some of the multiple nodes, or iii) information representative of potential violations by the at least some of the multiple nodes of the security policies of the network.

4. The method of claim 1, wherein the network includes one or more portals to manage network access between the network and remote nodes associated with different one or more networks, and wherein determining the potential violations by the dataflow stream comprises:

identifying unmanaged access between one of the remote nodes and one of the multiple computing nodes of the network that bypasses the one or more portals.

5. The method of claim 1, wherein determining the potential violations by the dataflow stream comprises one or more of:

determining whether security credentials associated with the dataflow stream are compromised;

determining whether strength level of the security credentials satisfies required security credentials strength criteria for the associated dataflow stream; or determining whether encryption level of data communicated via the dataflow stream satisfies encryption requirement criteria for the associated dataflow stream.

6. The method of claim 5, wherein in response to a determination that the security credentials are compromised or that the strength level of the security credentials fails to satisfy the required security credential strength criteria, invoking a process to cause, based on input provided by a user associated with the dataflow stream, modification of current security credentials to increase strength of the current security credentials associated with the dataflow stream, or to increase number of authentication factors used in association with the dataflow stream.

7. The method of claim 1, wherein the network-operation data stored in the one or more data storage units in the network is stored in one or more network-operation data directories implemented in the network.

8. The method of claim 1, further comprising:

performing one or more mitigation actions in response to a determination of a security policy violation by the dataflow stream, including one or more of:

a) sending a notification to a user associated with the dataflow stream or one or more of the nodes to establish new security credentials for accessing one or more of the multiple computing nodes of the network;

b) suspending access of the user associated with the dataflow stream;

c) establishing a multi-factor authentication procedure for the dataflow stream or for the user associated with the dataflow stream;

d) randomizing a password of the user;

e) modifying access privileges of the user to services and one or more of the multiple computing nodes on the network;

f) modifying security parameters for the one or more of the multiple computing nodes; or g) modifying security parameters of the network.

9. The method of claim 1, wherein determining the network security characteristics comprises:

determining the security characteristics using one or more learning and artificial intelligence-based engines.

10. The method of claim 1, wherein the network includes one or more portals to manage network access between the network and remote nodes associated with different one or more networks, and wherein determining the potential violations by the dataflow stream comprises:

identifying unmanaged access between one of the remote nodes and one of the multiple computing nodes of the network that bypasses the one or more portals.

11. The method of claim 1, wherein determining potential violations by the dataflow stream of one or more security policies comprises one or more of:

determining whether an identity access was initiated from a real user account or from a machine-run service/robo account;

determining anomalous behavior associated with an access attempt of the network;

determining that user-attempted access of a service implemented on the network requires credential randomization for an accessing user; or determining existence of dormant and forgotten accounts.

12. A system comprising:

a network comprising multiple computing nodes;

at least one flow sensor included in the network and configured to monitor dataflow streams and access-requests from remote user terminals; and a processor-based controller unit configured to:

monitor the dataflow streams in the network;

determine network security characteristics for a dataflow stream, from the monitored dataflow streams, relating to security, authentication, and access events for accessing, via the dataflow stream, one or more of the multiple computing nodes of the network;

determine potential violations by the dataflow stream of one or more security policies defined for operation of the network, access functionality for the network, or identity attributes used by the network, based, at least in part, on the determined network security characteristics for the dataflow stream, and based on network-operation data comprising one or more of network security data, network identity data, and network access data, with the network-operation data being stored in one or more data storage units in the network, and configured to manage network access and operation for the multiple computing nodes of the network;

determine whether a legacy service, implemented on one or more of the multiple computing nodes of the network, satisfies current network security requirements associated with one or more of the multiple computing nodes on which the legacy service is implemented;

adaptively establish, automatically by at the at least one flow sensor or at a non-local server different from the remote user terminals or the network, a complementary access process, the complementary access process acting as a proxy or intermediary service implementing a security interface to control access to the legacy service according to the current network security requirements, in response to determining that the legacy service does not satisfy the current network security requirements associated with the one or more of the multiple computing nodes having a computed authentication and access strength metric below a pre-determined threshold; and apply, by the automatically adaptively established complementary access process, the current network security requirements to control access to the legacy service.

13. The system of claim 12, wherein the controller unit configured to adaptively establish the complementary access process is configured to adaptively establish the access process to manage access to the legacy service, implemented on the one or more the multiple computing nodes, having a computed authentication and access strength metric below a pre-determined threshold.

14. The system of claim 12, wherein the controller unit configured to monitor the dataflow streams is configured to:

derive map data of at least some of the monitored dataflow streams in the network, including deriving path and access information, for the at least some of the monitored dataflow streams, between respective groups of nodes in the network; and generate, based on one or more of the map data, the network operation data, the determined network security characteristics, or the determined potential violations, a dynamic graph representative of dataflow access activity, at any particular time instance, within the network, the dynamic graph including information representative of one or more of: i) a number of the at least some of the monitored dataflow streams, ii) classes of destination nodes being accessed by at least some of the multiple computing nodes, or iii) information representative of potential violations by the at least some of the computing multiple nodes of the security policies of the network.

15. The system of claim 12, wherein the network includes one or more portals to manage network access between the network and remote nodes associated with different one or more networks, and wherein the controller unit configured to determine the potential violations by the dataflow stream is configured to:

identify unmanaged access between one of the remote nodes and one of the multiple computing nodes of the network that bypasses the one or more portals.

16. The system of claim 12, wherein the controller unit configured to determine the potential violations by the dataflow stream is configured to perform one or more of:

determining whether security credentials associated with the dataflow stream are compromised;

determining whether strength level of the security credentials satisfies required security credentials strength criteria for the associated dataflow stream; or determining whether encryption level of data communicated via the dataflow stream satisfies encryption requirement criteria for the associated dataflow stream.

17. The system of claim 16, wherein the controller is further configured to:

invoke, in response to a determination that the security credentials are compromised or that the strength level of the security credentials fails to satisfy the required security credential strength criteria, a process to cause, based on input provided by a user associated with the dataflow stream, modification of current security credentials to increase strength of the current security credentials associated with the dataflow stream, or to increase number of authentication factors used in association with the dataflow stream.

18. The system of claim 12, wherein the network-operation data stored in the one or more data storage units in the network is stored in one or more network-operation data directories implemented in the network.

19. The system of claim 12, wherein the controller unit configured to determine potential violations by the dataflow stream of one or more security policies is configured to perform one or more of:

determine whether an identity access was initiated from a real user account or from a machine-run service/robo account;

determine anomalous behavior associated with an access attempt of the network;

determine that user-attempted access of a service implemented on the network requires credential randomization for an accessing user; or determine existence of dormant and forgotten accounts.

20. Non-transitory computer-readable media comprising computer instructions executable on one or more processor-based devices to:

monitor, by at least one flow sensor, dataflow streams in a network comprising multiple computing nodes, wherein the at least one flow sensor is included in the network and configured to monitor the dataflow streams and access-requests from remote user terminals;

determine network security characteristics for a dataflow stream, from the monitored dataflow streams, relating to security, authentication, and access events for accessing, via the dataflow stream, one or more of the multiple nodes of the network;

determine potential violations by the dataflow stream of one or more security policies defined for operation of the network, access functionality for the network, or identity attributes used by the network, based, at least in part, on the determined network security characteristics for the dataflow stream, and based on network-operation data comprising one or more of network security data, network identity data, and network access data, with the network-operation data being stored in one or more data storage units in the network, and configured to manage network access and operation for the multiple computing nodes of the network;

determine whether a legacy service, implemented on one or more of the multiple computing nodes of the network, satisfies current network security requirements associated with one or more of the multiple computing nodes on which the legacy service is implemented;

adaptively establish, automatically at the at least one flow sensor or at a non-local server different from the remote user terminals or the network, a complementary access process, the complementary access process acting as a proxy or intermediary service implementing a security interface to control access to the legacy service according to the current network security requirements, in response to determining that the legacy service does not satisfy the current network security requirements associated with the one or more of the multiple computing nodes having a computed authentication and access strength metric below a pre-determined threshold; and apply, by the automatically adaptively established complementary access process, the current network security requirements to control access to the legacy service.

* * * * *